(12) United States Patent
Saitoh et al.

(10) Patent No.: US 11,133,691 B2
(45) Date of Patent: Sep. 28, 2021

(54) POWER FEED UNIT AND POWER FEEDING METHOD

(71) Applicant: Sony Corporation, Tokyo (JP)

(72) Inventors: Nobutaka Saitoh, Kanagawa (JP); Yukio Tsuchiya, Kanagawa (JP); Toshiya Nakabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 16/604,676

(22) PCT Filed: Mar. 5, 2018

(86) PCT No.: PCT/JP2018/008237
§ 371 (c)(1),
(2) Date: Oct. 11, 2019

(87) PCT Pub. No.: WO2018/193730
PCT Pub. Date: Oct. 25, 2018

(65) Prior Publication Data
US 2020/0161886 A1  May 21, 2020

(30) Foreign Application Priority Data
Apr. 18, 2017 (JP) .............................. JP2017-081867

(51) Int. Cl.
*H02J 7/00* (2006.01)
*H01M 2/10* (2006.01)
(Continued)

(52) U.S. Cl.
CPC ......... *H02J 7/0063* (2013.01); *H01M 10/425* (2013.01); *H01M 10/441* (2013.01);
(Continued)

(58) Field of Classification Search
CPC .... H02J 7/0063; H02J 7/0042; H01M 2/1022; H01M 2010/4278; H01M 10/425; H01M 10/441
(Continued)

(56) References Cited

U.S. PATENT DOCUMENTS 6,018,227 A * 1/2000 Kumar et al. ...... H02J 7/00036
320/106
6,502,949 B1 * 1/2003 Horiyama et al. . B23Q 11/0046
173/217

(Continued)

FOREIGN PATENT DOCUMENTS

JP  2006-133231 A  5/2006
JP  2007-335337 A  12/2007
(Continued)

*Primary Examiner* — Sun J Lin
(74) *Attorney, Agent, or Firm* — Michael Best & Friedrich LLP

(57) ABSTRACT

A power feed unit that includes multiple first terminal sections, a second terminal section, and a switch is disclosed. Each first terminal section includes a first power supply terminal directed to receive electric power from a battery, and a first communication terminal directed to perform a communication with the battery. The second terminal section includes a second power supply terminal directed to supply electric power to an electronic apparatus, and a second communication terminal directed to perform a communication with the electronic apparatus. The switch electrically couples one of the first communication terminals with the second communication terminal.

15 Claims, 12 Drawing Sheets

(51) Int. Cl.
   *H01M 10/42* (2006.01)
   *H01M 10/44* (2006.01)
   *H01M 50/20* (2021.01)

(52) U.S. Cl.
   CPC ........... *H01M 50/20* (2021.01); *H02J 7/0042* (2013.01); *H01M 2010/4278* (2013.01)

(58) Field of Classification Search
   USPC .......................................................... 320/126
   See application file for complete search history.

(56) References Cited

U.S. PATENT DOCUMENTS

| | | | | |
|---|---|---|---|---|
| 6,521,370 | B1* | 2/2003 | Takeshita et al. | H01M 50/213 429/96 |
| 7,253,585 | B2* | 8/2007 | Johnson et al. | H02J 7/0029 320/112 |
| 7,508,171 | B2* | 3/2009 | Carrier et al. | H01M 10/488 320/138 |
| 7,567,058 | B2* | 7/2009 | Shimizu et al. | B25F 5/02 320/106 |
| 7,999,511 | B2* | 8/2011 | Umetsu | H02J 7/0013 320/128 |
| 9,559,524 | B2* | 1/2017 | Uramoto | H02J 50/80 |
| 9,570,920 | B2* | 2/2017 | Haseno et al. | H02J 50/10 |
| 9,917,451 | B2* | 3/2018 | Kim | H02J 7/0031 |
| 10,008,876 | B2* | 6/2018 | Uramoto | H02J 50/05 |
| 10,778,035 | B2* | 9/2020 | Haseno et al. | H02J 50/05 |

FOREIGN PATENT DOCUMENTS

| | | |
|---|---|---|
| JP | 2012-035398 A | 2/2012 |
| JP | 2015-006095 A | 1/2015 |
| WO | 2015/060576 A1 | 4/2015 |

* cited by examiner

[ FIG. 1 ]
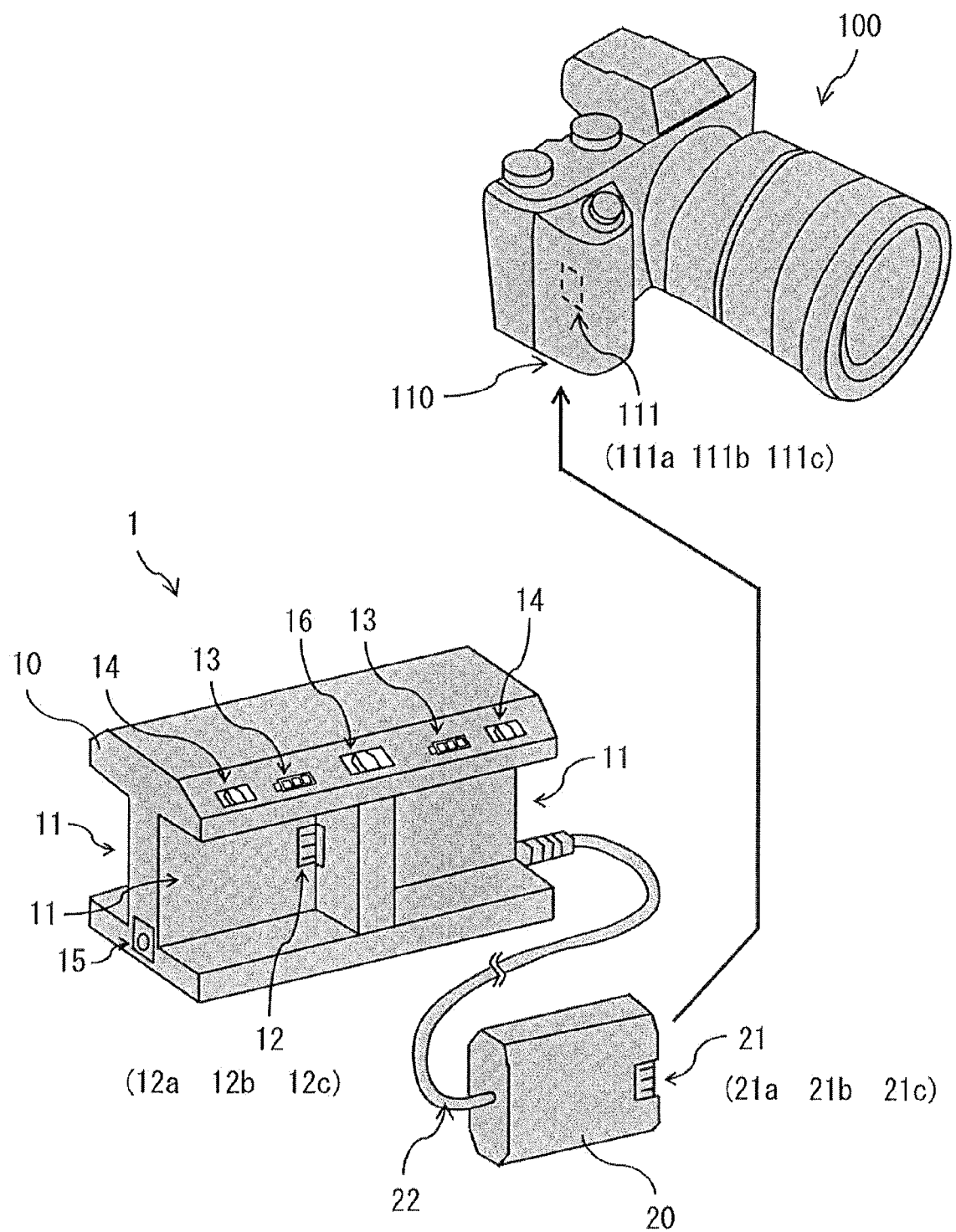

[ FIG. 2 ]
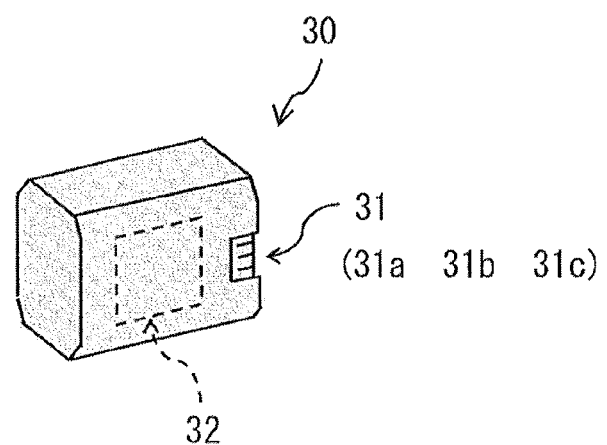

[ FIG.3 ]
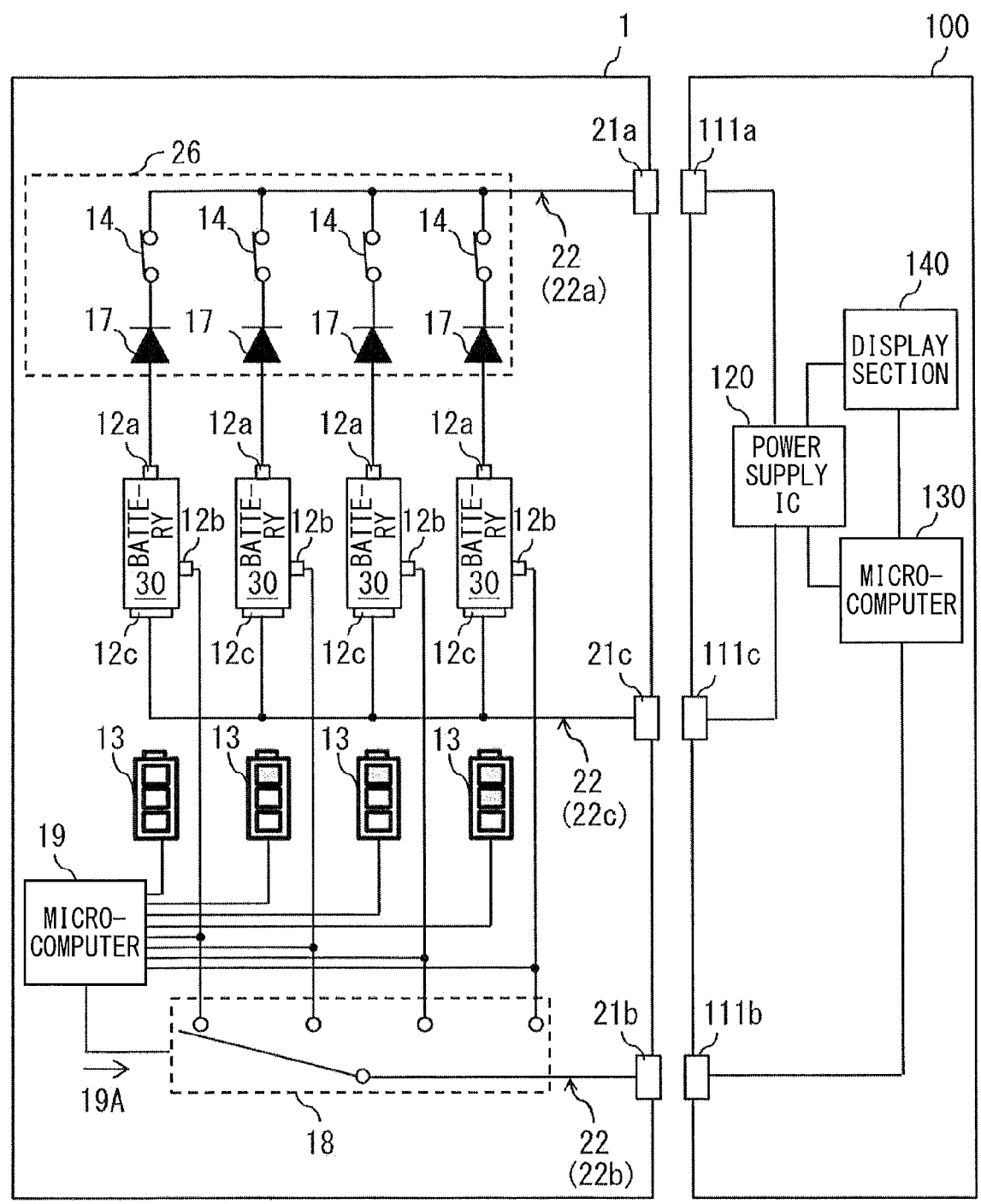

[ FIG. 4 ]
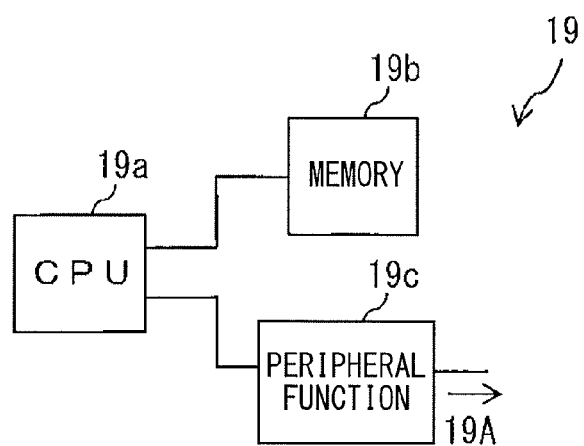

[ FIG. 5 ]
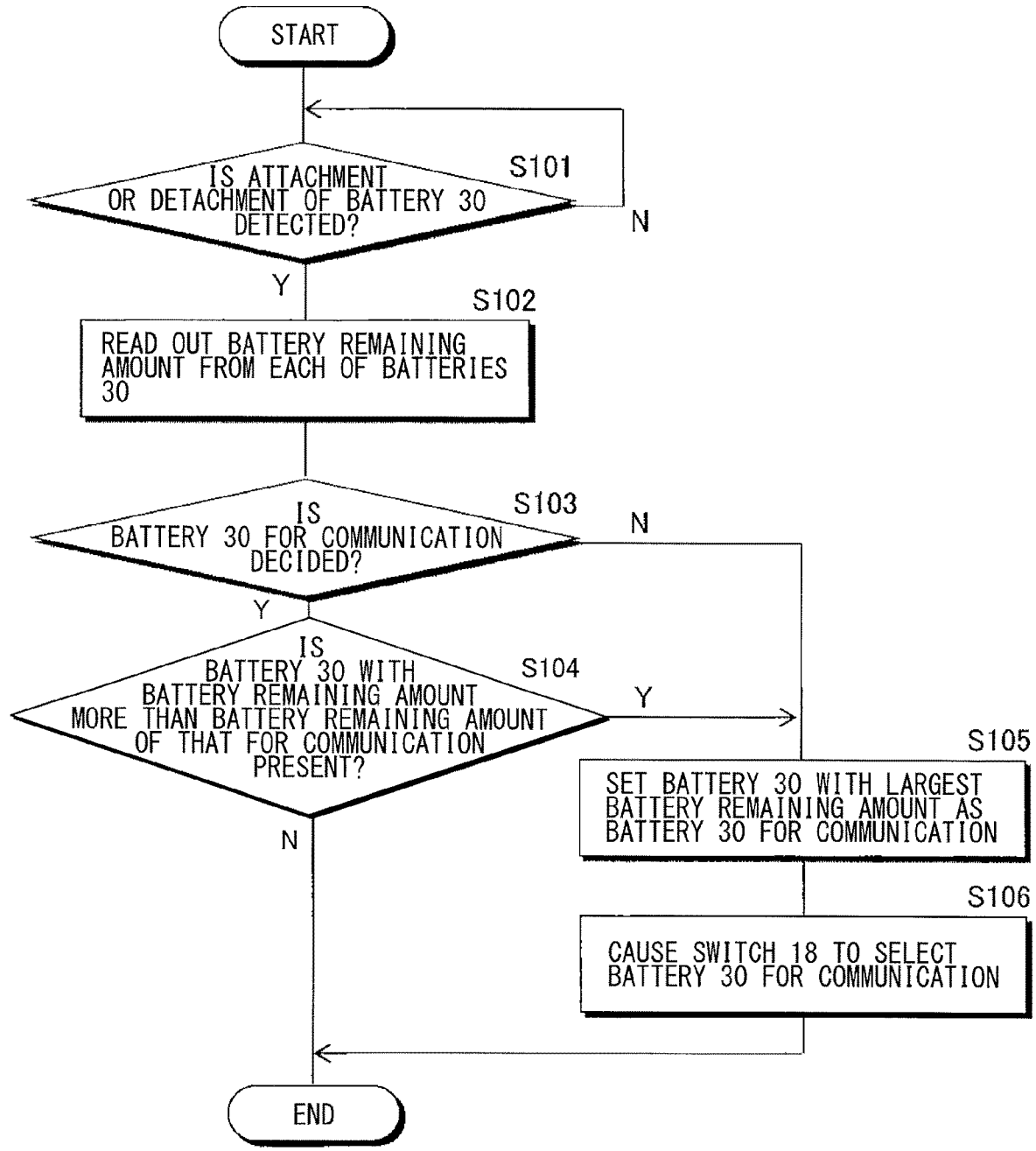
[ FIG. 6 ]
| BATTERY NUMBER | (1) | (2) | (3) | (4) |
|---|---|---|---|---|
| BATTERY REMAINING AMOUNT | 100% | 80% | 60% | 40% |

[ FIG. 7 ]
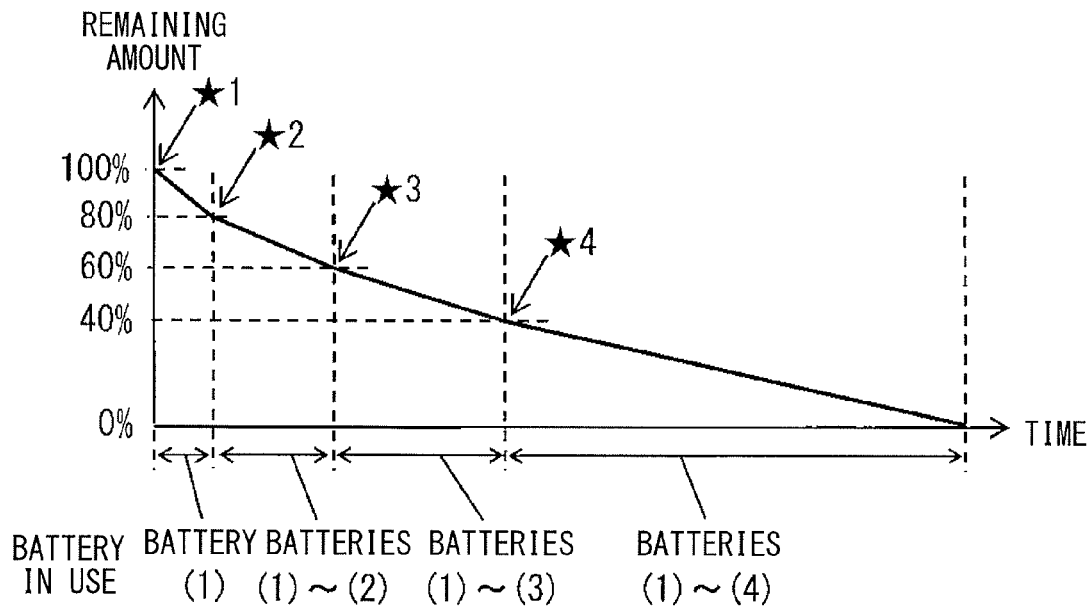
[ FIG. 8 ]
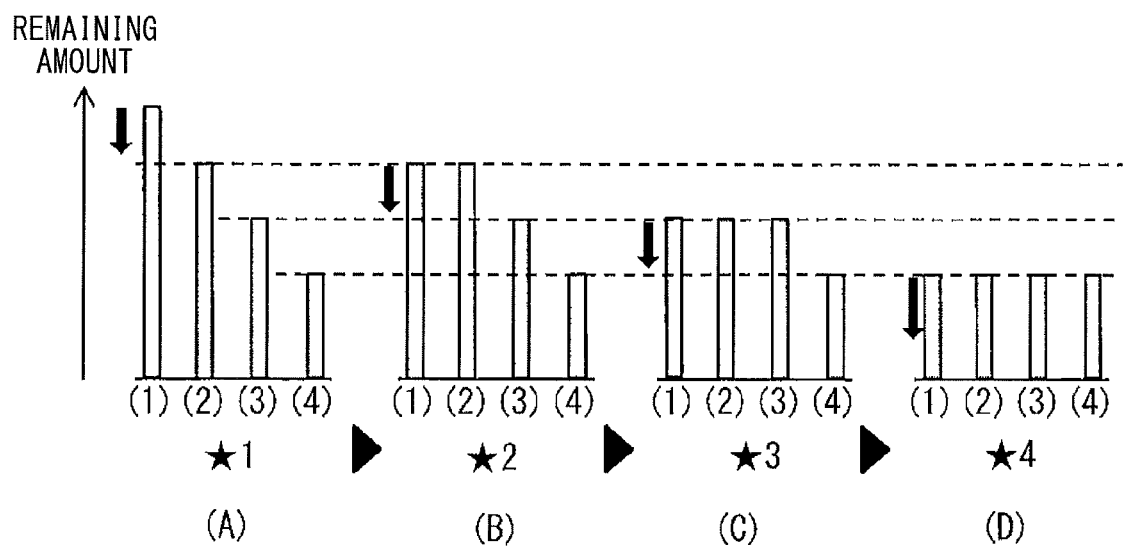

[ FIG. 9 ]
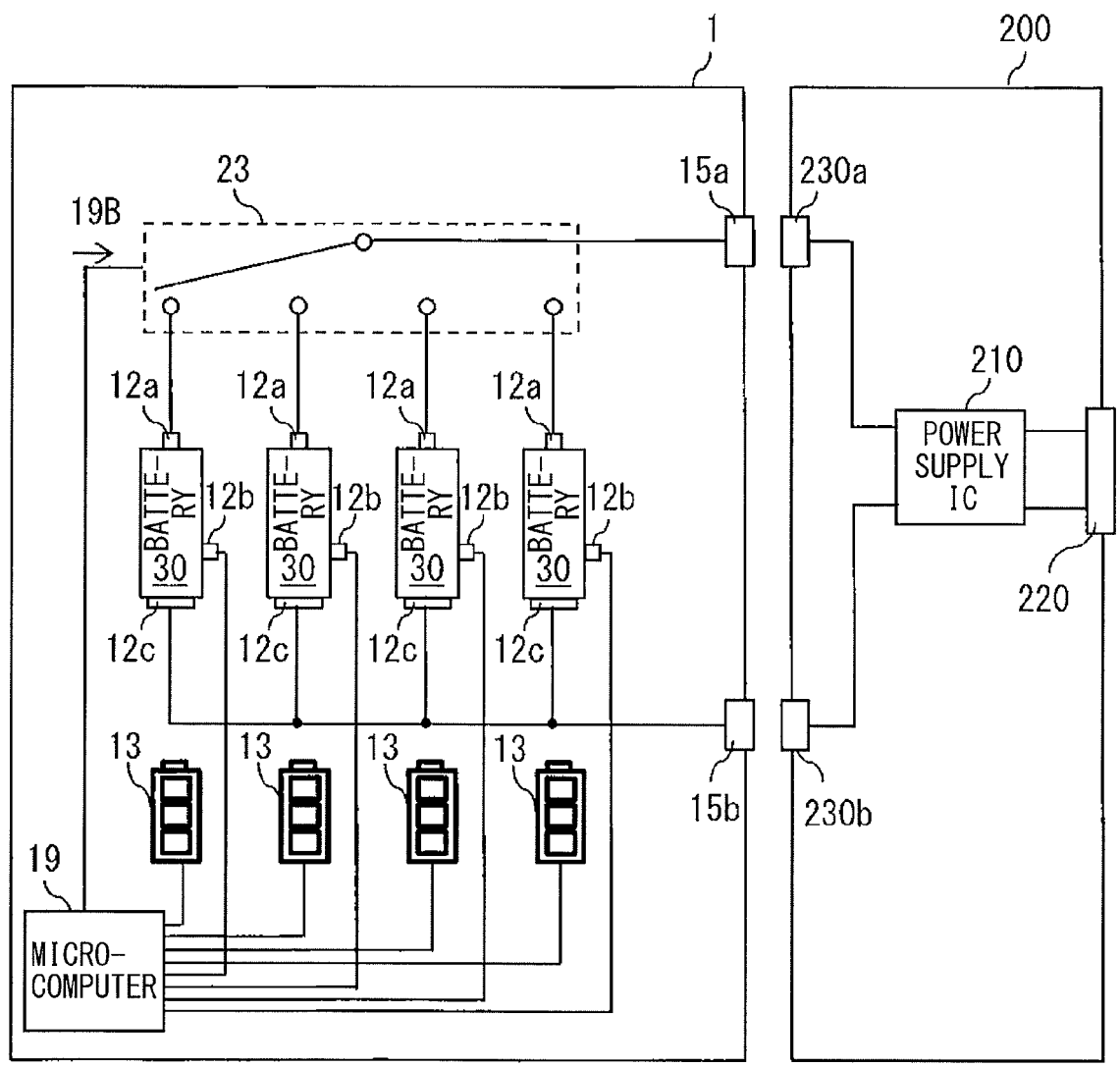

[ FIG. 10 ]
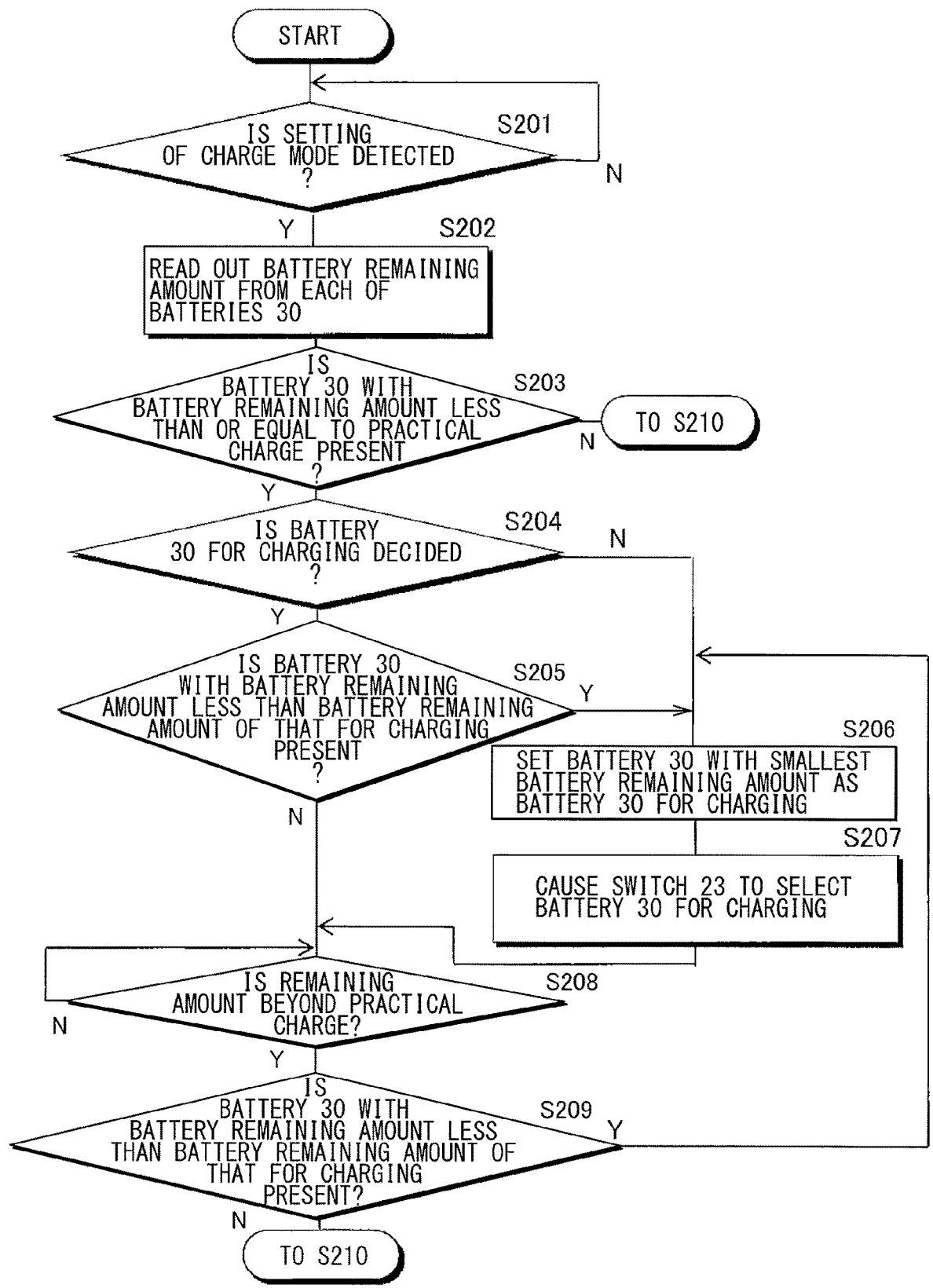

[ FIG. 11 ]
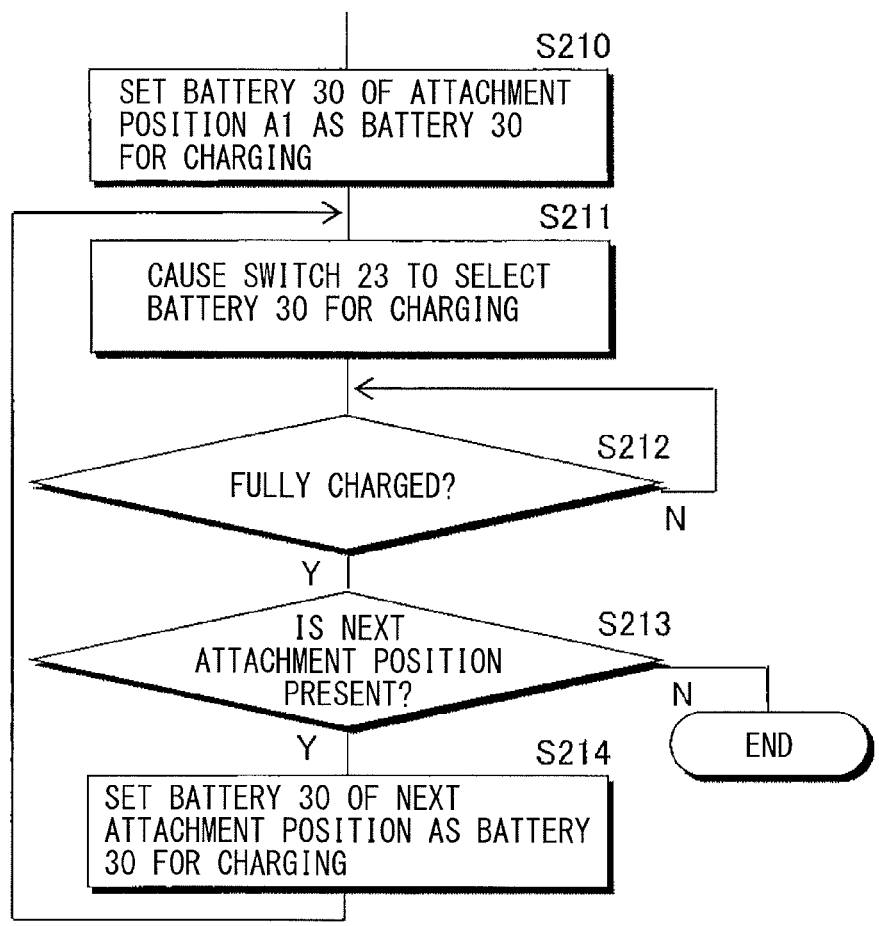

[ FIG. 12 ]
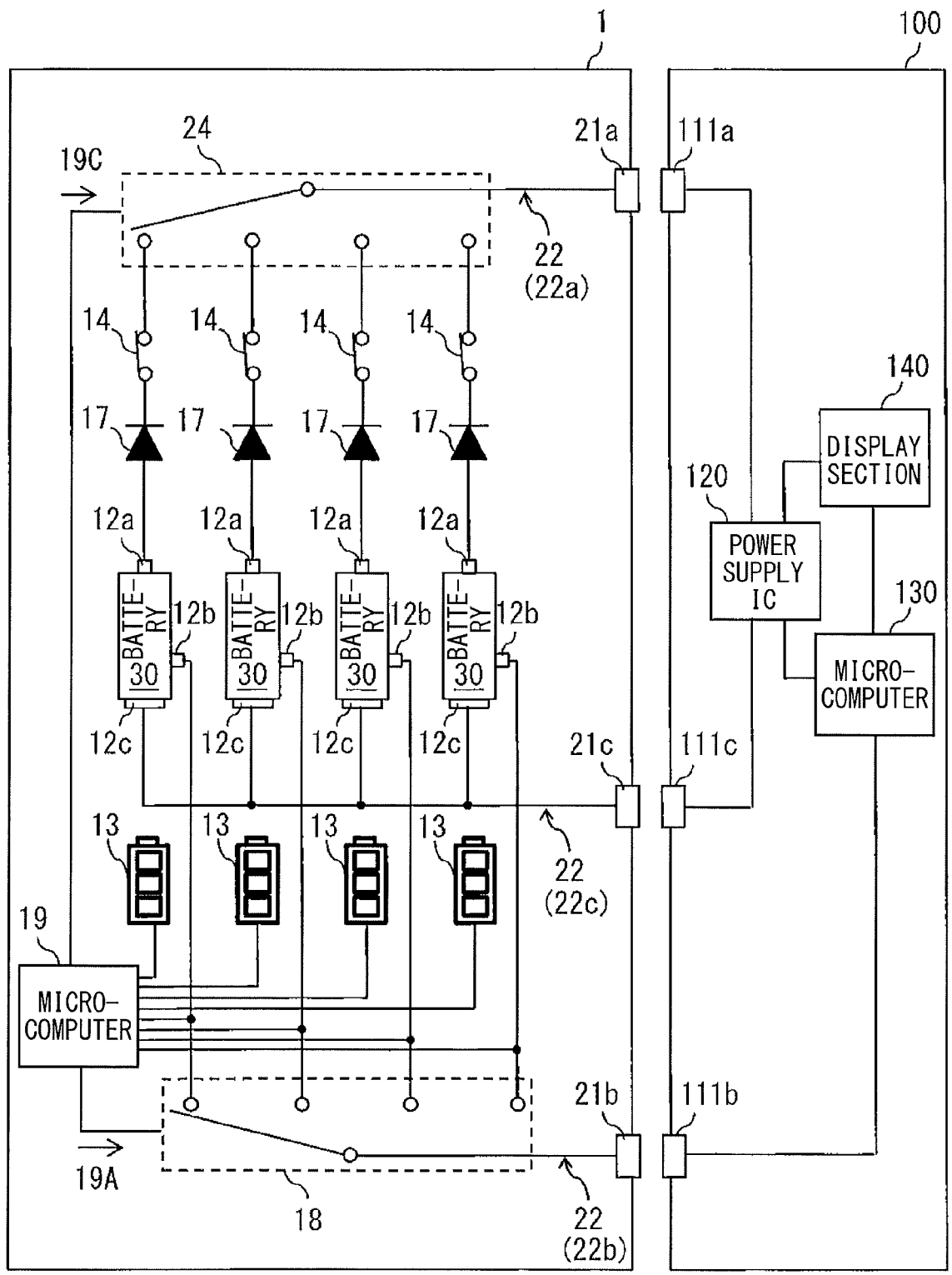

[ FIG. 13 ]
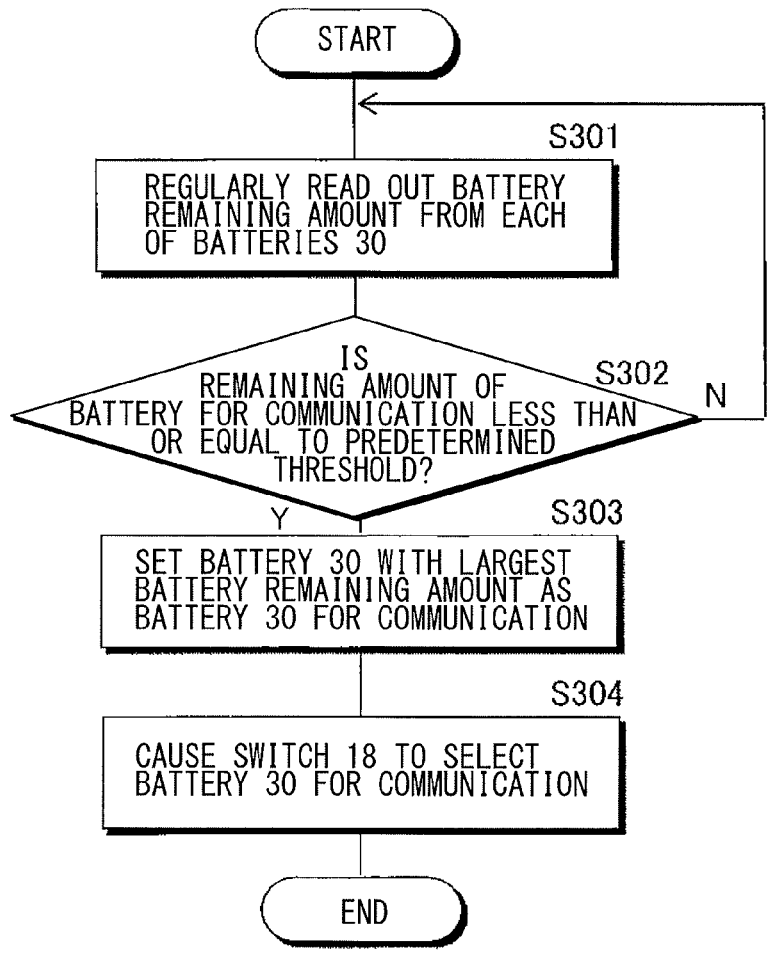
[ FIG. 14 ]
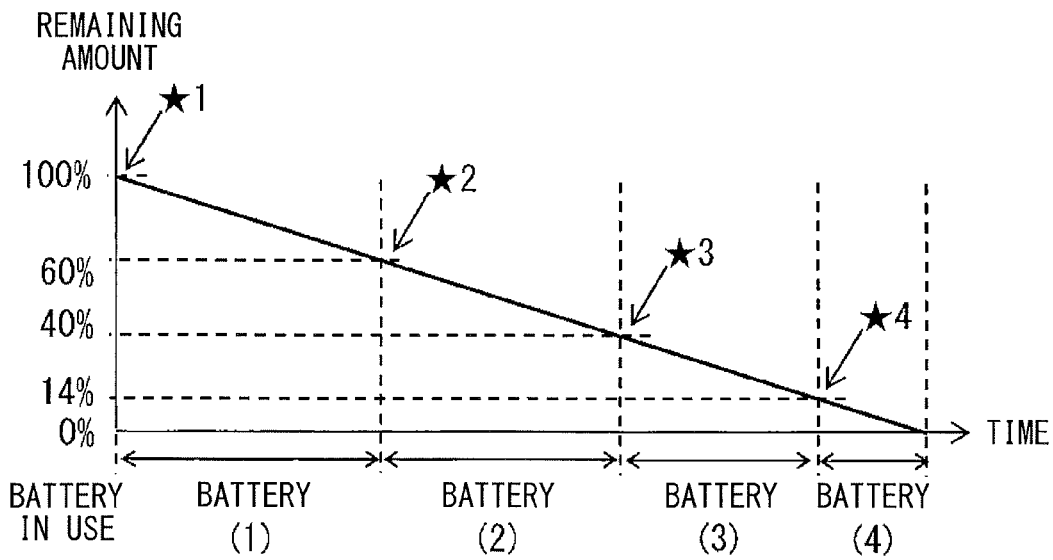

[ FIG. 15 ]
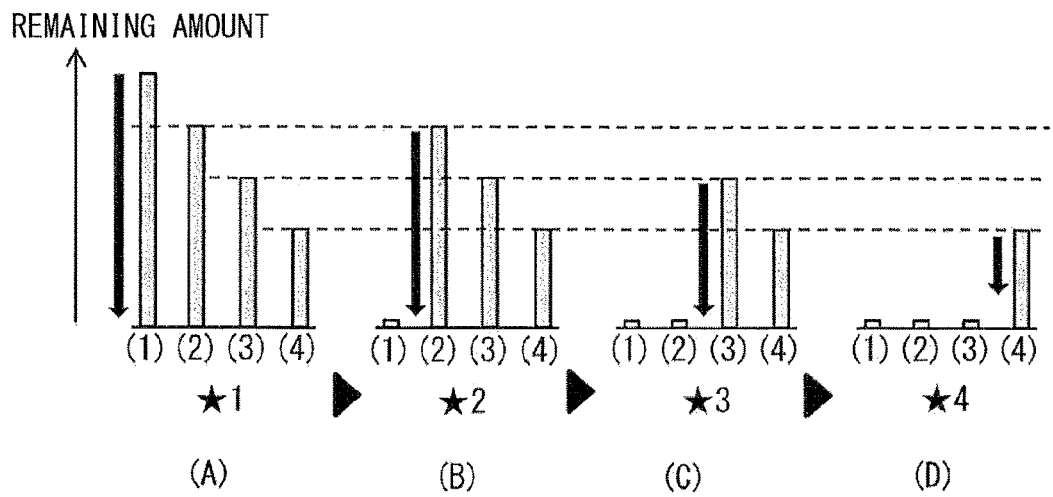
[ FIG. 16 ]
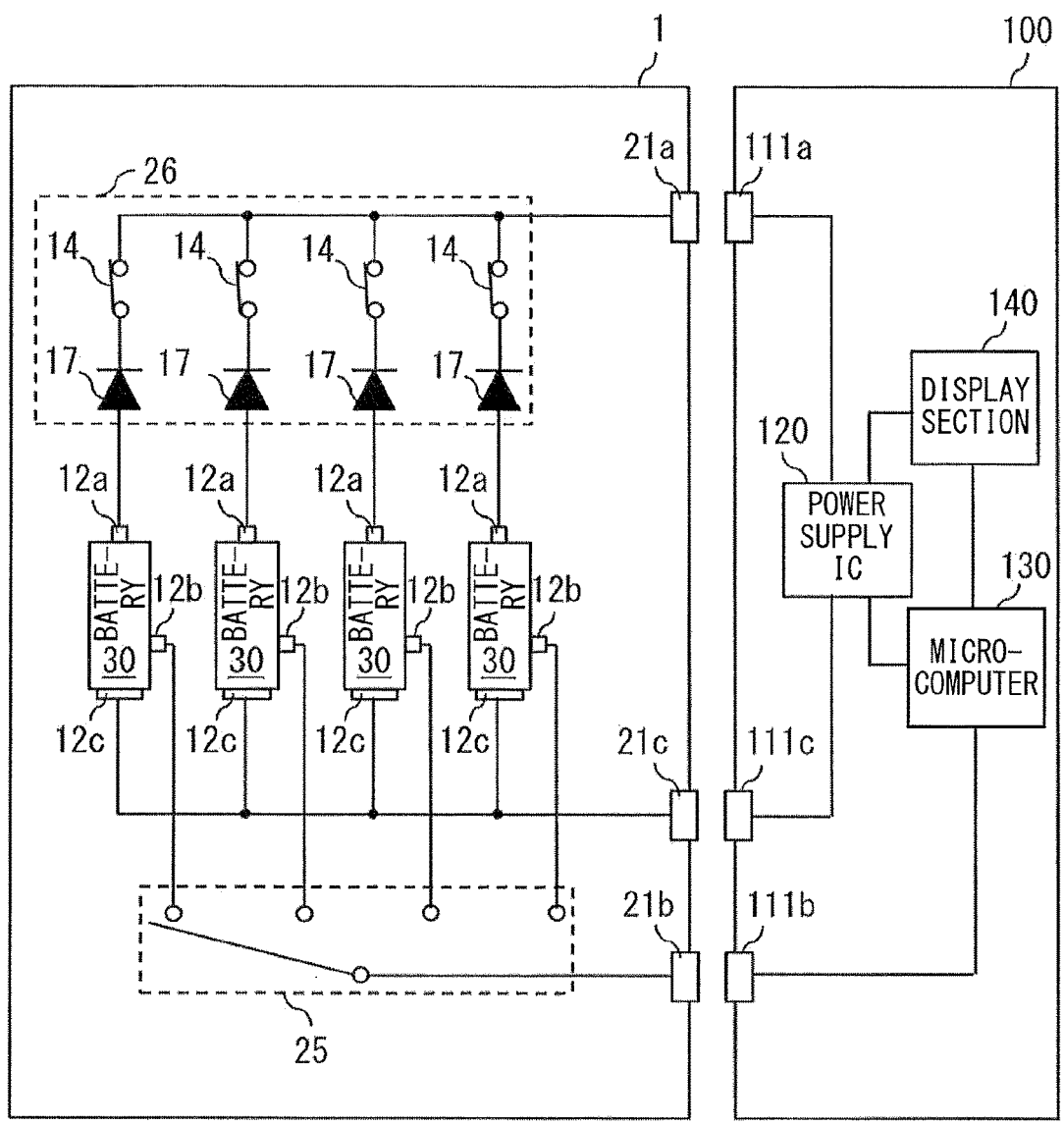

POWER FEED UNIT AND POWER FEEDING METHOD

TECHNICAL FIELD

The present disclosure relates to a power feed unit and a power feeding method.

BACKGROUND ART

In a lithium ion battery, estimating a remaining amount on the basis of a voltage is difficult. For this reason, a microcomputer is mounted on a battery pack to measure a remaining amount of a battery. For example, PTL 1 discloses measurement of a remaining amount of a battery.

CITATION LIST

Patent Literature

PTL 1: Japanese Unexamined Patent Application Publication No. 2006-133231

SUMMARY OF THE INVENTION

Incidentally, in a case where two or more batteries are used, an electronic apparatus that receives power supply from each of the batteries grasps a remaining amount of each of the batteries by performing communication with each of the batteries. However, providing, in the electronic apparatus, a special terminal configuration that is different from a terminal configuration for communication between the electronic apparatus and one battery to perform such communication is to be avoided from the viewpoint of cost and the like. It is therefore desirable to provide a power feed unit and a power feeding method that make it possible to perform communication between an electronic apparatus and each of batteries in a common terminal configuration regardless of how many batteries are provided.

A power feed unit according to an embodiment of the present disclosure is a power feed unit that feeds electric power to an electronic apparatus with use of two or more batteries each provided with a microcomputer. The power feed unit includes two or more accommodation sections each accommodate one battery, and two or more first terminal sections each of which is provided for each of the accommodation sections. The first terminal sections each includes a first power supply terminal directed to receiving electric power from the battery, and a first communication terminal directed to performing communication with the battery. The power feed unit further includes a second terminal section and a first switch. The second terminal section includes a second power supply terminal directed to supplying electric power to the electronic apparatus, and a second communication terminal directed to performing communication with the electronic apparatus. The first switch electrically couples one first communication terminal of the two or more first communication terminals and the second communication terminal to each other.

In the power feed unit according to the embodiment of the present disclosure, the one first communication terminal of the two or more first communication terminals each to be coupled to corresponding one of the batteries with respect to the batteries, and the second communication terminal to be coupled to the electronic apparatus are electrically coupled to each other by the first switch. This makes it possible to provide the electronic apparatus with a terminal configuration similar to a terminal configuration directed to performing communication between the electronic apparatus and the one battery.

A power feeding method according to an embodiment of the present disclosure is a power feeding method of feeding electric power from a power feed unit to an electronic apparatus with the use of two or more batteries each provided with a microcomputer. The power feed unit to which the power weeding method is applied includes components the same as those of the power feed unit described above. The power feeding method includes selecting the one first communication terminal on the basis of a remaining amount of each of the batteries when detecting attachment or detachment of one or more of batteries on the basis of a result of communication with each of the batteries via corresponding one of the first communication terminals, and electrically coupling the selected first communication terminal and the second communication terminal to each other via the first switch.

In the power feeding method according to the embodiment of the present disclosure, one first communication terminal is selected on the basis of the remaining amount of each of the batteries when attachment or detachment of one or more of the batteries is detected on the basis of a result of communication with each of the batteries via corresponding one of the first communication terminals, and the selected first communication terminal and the second communication terminal are electrically coupled to each other via the first switch. This makes it possible to provide the electronic apparatus with a terminal configuration similar to a terminal configuration directed to performing communication between the electronic apparatus and the one battery.

According to the power feed unit and the power feeding method of the respective embodiments of the present disclosure, because the electronic apparatus is provided with the terminal configuration similar to the terminal configuration directed to performing communication between the electronic apparatus and the one battery, it is possible to perform communication between the electronic apparatus and each of the batteries in a common terminal configuration regardless of how many batteries are provided. It is to be noted that effects of the present disclosure are not necessarily limited to effects described here, and may be any of effects described in the present specification.

BRIEF DESCRIPTION OF DRAWINGS

FIG. 1 is a diagram illustrating a perspective configuration example of a power feed unit according to an embodiment of the present disclosure and an imaging unit using the power feed unit.

FIG. 2 is a diagram illustrating a perspective configuration example of a battery to be accommodated in the power feed unit in FIG. 1.

FIG. 3 is a diagram illustrating a circuit configuration example of the power feed unit and the imaging unit in FIG. 1.

FIG. 4 is a diagram illustrating an internal configuration example of a microcomputer in FIG. 3.

FIG. 5 is a diagram illustrating an example of a procedure for selection of the battery in the power feed unit in FIG. 1.

FIG. 6 is a diagram illustrating an example of a remaining amount of each of batteries to be attached to the power feed unit in FIG. 1.

FIG. 7 is a diagram illustrating an example of a displacement of a remaining amount of the power feed unit, at a time when the power feed unit in FIG. 1 is attached to the imaging unit.

FIG. 8 is a diagram illustrating an example of displacement of a remaining amount of each of the batteries at a time when the power feed unit in FIG. 1 is attached to the imaging unit.

FIG. 9 is a diagram illustrating a circuit configuration example of the power feed unit in FIG. 1 and an AC adapter.

FIG. 10 is a diagram illustrating an example of a procedure for selection of the battery in the power feed unit in FIG. 9.

FIG. 11 is a diagram illustrating the example of the procedure for selection of the battery in the power feed unit in FIG. 9.

FIG. 12 is a diagram illustrating a modification example of the circuit configuration of the power feed unit and the imaging unit in FIG. 1.

FIG. 13 is a diagram illustrating an example of a procedure for selection of the battery in the power feed unit in FIG. 12.

FIG. 14 is a diagram illustrating an example of displacement of a remaining amount of the power feed unit at a time when the power feed unit in FIG. 13 is attached to the imaging unit.

FIG. 15 is a diagram illustrating an example of displacement of a remaining amount of each of the batteries at a time when the power feed unit in FIG. 12 is attached to the imaging unit.

FIG. 16 is a diagram illustrating a modification example of the circuit configuration of the power feed unit and the imaging unit in FIG. 1.

MODES FOR CARRYING OUT THE INVENTION

Some embodiments of the present disclosure are described below in detail with reference to the drawings. The following description is a specific example of the present disclosure, and the present disclosure is not limited to the following implementations. In addition, the present disclosure is not limited to arrangement, dimensions, a dimension ratio, and the like of each component illustrated in each of the drawings as well. It is to be noted that the description is given in the following order.

1. Embodiment

2. Modification Examples

1. Embodiment

[Configuration]

A power feed unit 1 according to an embodiment of the present disclosure is described. FIG. 1 illustrates an example of a perspective configuration of the power feed unit 1 and an imaging unit 100 to be coupled to the power feed unit 1.

The power feed unit 1 is a unit that feeds electric power to an electronic apparatus such as the imaging unit 100, using two or more batteries 30. The imaging unit 100 operates with, for example, a battery accommodated in a battery accommodation section 110. In the present embodiment, the imaging unit 100 is operated with the two or more batteries 30 coupled to a coupling section 20, by placing the coupling section 20 (described later) of the power feed unit 1 in the battery accommodation section 110, instead of placing the battery in the battery accommodation section 110.

The battery accommodation section 110 includes a terminal section 111 for power receiving. The terminal section 111 has, for example a three-terminal configuration. The terminal section 111 includes, for example, a power supply terminal 111a directed to receiving supply of electric power from the power feed unit 1, a communication terminal 111b directed to performing of communication with the power feed unit 1, and a ground (GND) terminal 111c that defines a reference potential. The coupling section 20 includes a terminal section 21 (a second terminal section) for feeding. The coupling section 20 has a shape identical or similar to a shape of the battery 30. The terminal section 21 has a terminal configuration corresponding to the terminal section 111 of the battery accommodation section 110 and a terminal section 12 of the power feed unit 1. The terminal section 21 has, for example, a terminal configuration (e.g., a three-terminal configuration) common to a terminal configuration of the battery 30. The terminal section 21 includes, for example, a power supply terminal 21a (a second power supply terminal) directed to supplying the imaging unit 100 with electric power, a communication terminal 21b (a second communication terminal) directed to performing communication with the imaging unit 100, and a GND terminal 21c that defines a reference potential. When the coupling section 20 is accommodated in the battery accommodation section 110, the terminal section 21 of the coupling section 20 and the terminal section 111 of the battery accommodation section 110 are electrically coupled to each other. Specifically, the power supply terminal 21a of the terminal section 21 and the power supply terminal 111a of the terminal section 111 are electrically coupled to each other. Further, the communication terminal 21b of the terminal section 21 and the communication terminal 111b of the terminal section 111 are electrically coupled to each other, and the GND terminal 21c of the terminal section 21 and the GND terminal 111c of the terminal section 111 are electrically coupled to each other. The coupling section 20 further includes a cable 22 that couples the terminal section 21 and a circuit within a main body 10 to each other. The cable 22 is configured by a flexible cable, and includes, for example, three cables (a cable for power supply, a cable for communication, and a cable for GND).

FIG. 2 illustrates an example of a perspective configuration of the battery 30 to be accommodated in the power feed unit 1. The battery 30 includes, for example, a lithium ion battery, a terminal section 31 coupled to a positive electrode and a negative electrode of the lithium ion battery, and a microcomputer 32 coupled to the terminal section 31. The terminal section 31 has a terminal configuration corresponding to the terminal section 111 of the battery accommodation section 110 and the terminal section 12 of the power feed unit 1. The terminal section 31 includes, for example, a power supply terminal 31a coupled to the positive electrode of the lithium ion battery, a GND terminal 12c coupled to the negative electrode of the lithium ion battery, and a communication terminal 12b coupled to the microcomputer 32. The microcomputer 32 performs measurement of a remaining amount (a remaining capacity) of the lithium ion battery and outputs data of the battery remaining amount obtained by the measurement to outside via a communication terminal 31b.

The battery 30 may include a rechargeable battery other than the lithium ion battery. The battery 30 may have a shape and a size allowing the battery 30 to be accommodated in the battery accommodation section 110, or may have a shape and a size not allowing the battery 30 to be accommodated in the battery accommodation section 110. The battery 30 only has to have a shape and a size allowing the battery 30 to be accommodated in a battery accommodation section 11 (described later) of the power feed unit 1.

The power feed unit 1 includes the main body 10 that accommodates the two or more batteries 30, and the coupling section 20 to be electrically coupled to the two or more batteries 30 accommodated in the main body 10. The main body 10 is shaped like, for example, a box, and includes two or more (e.g., four) battery accommodation sections 11 (accommodation sections) each provided on a side face of the box to accommodate one battery 30. The main body 10 includes two or more (e.g., four) terminal sections 12 (first terminal sections) each provided for corresponding one of the battery accommodation sections 11. Each of the terminal sections 12 has a terminal configuration common to the terminal section 111 of the battery accommodation section 110. The terminal section 21 has, for example, a terminal configuration (e.g., a three-terminal configuration) corresponding to the terminal configuration of each of the terminal section 31 of the battery 30 and the terminal section 21 of the coupling section 20. Each of the terminal sections 12 includes, for example, a power supply terminal 12a (a first power supply terminal) directed to receiving electric power from the battery 30, the communication terminal 12b (a first communication terminal) directed to performing communication with the battery 30, and the GND terminal 12c that defines a reference potential. When the battery 30 is accommodated in the battery accommodation section 11, the terminal section 31 of the battery 30 and the terminal section 12 of the battery accommodation section 11 are electrically coupled to each other. Specifically, the power supply terminal 31a of the terminal section 31 and the power supply terminal 12a of the terminal section 12 are electrically coupled to each other. Further, the communication terminal 31b of the terminal section 31 and the communication terminal 12b of the terminal section 12 are electrically coupled to each other, and a GND terminal 31c of the terminal section 31 and the GND terminal 12c of the terminal section 12 are electrically coupled to each other. A point where two or more GND terminals 31c are coupled to each other and the GND terminal 12c are electrically coupled by, for example, the cable 22 (22c).

The main body 10 includes, for example, two or more (e.g., four) remaining amount confirmation lamps 13 each assigned to corresponding one of the battery accommodation sections 11, and two or more (e.g., four) output switches 14 each assigned to corresponding one of the battery accommodation sections 11. The remaining amount confirmation lamp 13 displays a remaining amount of the battery 30 accommodated in the corresponding battery accommodation section 11. The output switch 14 is a manual switch that switches between connection and disconnection between the power supply terminal 12a provided in the corresponding battery accommodation section 11 and the power supply terminal 21a. The main body 10 further includes, for example, a feed/charge switch 16. The feed/charge switch 16 is a manual switch that switches a mode of the main body 10 to a feed mode or a charge mode. When the mode of the main body 10 is the feed mode, each of the batteries 30 (or each of the terminal sections 12) and the terminal section 21 that is a feed terminal are electrically coupled to each other. When the mode of the main body 10 is the charge mode, each of the batteries 30 (or each of the terminal sections 12) and a power supply input terminal section 15 that is a charge terminal are electrically coupled to each other.

FIG. 3 illustrates an example of a circuit configuration of the power feed unit 1 and the imaging unit 100. A circuit configuration at a time when the battery 30 is accommodated in the battery accommodation section 11 is exemplified in FIG. 3. The power feed unit 1 includes the two or more (e.g., four) terminal sections 12 each provided for corresponding one of the battery accommodation sections 11, as described above. To each of the terminal sections 12, the terminal section 31 of the battery 30 accommodated in the corresponding battery accommodation section 11 is electrically coupled. The power supply terminal 12a of each of the terminal sections 12 is electrically coupled to the power supply terminal 21a, via a diode 17 for backflow prevention and the output switch 14 to be manually operated. In other words, the power supply terminals 12a of the respective terminal sections 12 are coupled in parallel with each other, with respect to the power supply terminal 21a. That is to say, the power feed unit 1 includes a circuit (a parallel coupling circuit 26) that couples the two or more power supply terminals 12a to each other in parallel, with respect to the power supply terminal 21a. The parallel coupling circuit 26 includes, for example, the diode 17 and the output switch 14 coupled to each other in serial, within a wiring line branched from the power supply terminal 21a to each of the power supply terminals 12a. A point where the two or more output switches 14 are coupled to each other and the power supply terminal 21a are electrically coupled by, for example, the cable 22 (22a).

The power feed unit 1 further includes a switch 18 (a first switch) directed to electrically coupling one of the two or more communication terminals 12b and the communication terminal 21b to each other, and a microcomputer 19 that controls the switch 18. The switch 18 is an electronic control switch that electrically couples one of the two or more communication terminals 12b and the communication terminal 21b to each other, in accordance with a control signal 19A provided by the microcomputer 19. The microcomputer 19 outputs, to the switch 18, the control signal 19A which electrically couples the one communication terminal 12b selected on the basis of a remaining amount of each of the batteries 30 and the communication terminal 21b to each other. The microcomputer 19 outputs, to the switch 18, the control signal 19A which electrically couples the communication terminal 12b corresponding to the battery 30 with the largest battery remaining amount and the communication terminal 21b to each other. It is to be noted that a terminal on side of the communication terminal 21b of the switch 18 and the communication terminal 21b are electrically coupled by, for example, the cable 22 (22b).

The microcomputer 19 is, for example, as illustrated in FIG. 4, an integrated circuit including a CPU (Central Processing Unit) 19a, a memory 19b, and a peripheral function 19c. The CPU 19a executes a predetermined operation, processing, etc. by reading out a program, data, etc. stored in the memory 19b, and executing the read-out program. The memory 19b is, for example, an SRAM (Static Random Access Memory). For example, the number of the battery 30 set for communication or the number of the communication terminal 12b corresponding to the battery 30 set for communication is stored in the memory 19b. The peripheral function 19c includes, for example, a circuit that is directed to connecting the CPU 19a and each of the switch 18, the communication terminal 12b, and the remaining amount confirmation lamp 13 to each other. The CPU 19a outputs the control signal 19A to outside via the peripheral function 19c.

The imaging unit 100 includes, for example, as illustrated in FIG. 1 and FIG. 3, the battery accommodation section 110, the terminal section 111, a power supply IC 120, a microcomputer 130, and a display section 140. The terminal section 111 includes, for example, the power supply terminal 111a, the communication terminal 111b, and the GND terminal 111c, as described above. The power supply IC 120 modulates electric power inputted from the power feed unit 1 to the power supply terminal 111a and the GND terminal 111c, into electric power of magnitude suitable for each of devices (e.g., the microcomputer 130, the display section 140, etc.) within the imaging unit 100. The power supply IC 120 supplies the modulated electric power to each of the devices (e.g., the microcomputer 130, the display section 140, etc.) within the imaging unit 100. The microcomputer 130 controls each of the devices within the imaging unit 100.

The microcomputer 130 generates predetermined remaining amount display, on the basis of data of a battery remaining amount inputted from the power feed unit 1 to the communication terminal 111b. Here, examples of the predetermined remaining amount display include % display of a remaining amount and gauge display of a remaining amount. The microcomputer 130 causes the display section 140 to display the generated predetermined remaining amount display. The microcomputer 130 generates, for example, an image signal including the generated predetermined remaining amount display, and transmits the image signal to the display section 140. The display section 140 displays an image on the basis of the image signal inputted from the microcomputer 130. The display section 140 displays, for example, the predetermined remaining amount display generated in the microcomputer 130, on a display screen.

(Selection of Battery 30 During Feeding)

Next, a procedure for selection of the battery 30 during feeding in the power feed unit 1 is described. FIG. 5 illustrates an example of the procedure for selection of the battery 30 during feeding in the power feed unit 1.

Assume that the main body 10 is in the feed mode. Specifically, assume that each of the batteries 30 (or each of the terminal sections 12) and the terminal section 21 that is the feed terminal are electrically coupled to each other by the feed/charge switch 16. At this time, the microcomputer 19 periodically detects presence or absence of attachment or detachment of the battery 30 (step S101). The microcomputer 19 detects the presence or absence of the attachment or detachment of the battery 30, on the basis of a result of communication with each of the batteries 30 via corresponding one of the communication terminals 12b.

At this time, for example, in a case where a predetermined difference between a previously-acquired result and a newly-acquired result is present, the microcomputer 19 determines that the attachment or detachment of the battery 30 is present. In other words, the microcomputer 19 detects the attachment or detachment of the battery 30 (step S101: Y). Here, examples of the "predetermined difference" include a case where there is a difference between the previous time and this time in terms of the number of the batteries 30 in successful communication, etc. In contrast, in a case where the predetermined difference between the previously-acquired result and the newly-acquired result is not present, the microcomputer 19 determines that no attachment or detachment of the battery 30 is present. In other words, the microcomputer 19 does not detect the attachment or detachment of the battery 30 (step S101: N). The microcomputer 19 continues detecting the presence or absence of the attachment or detachment of the battery 30 periodically, unless the attachment or detachment of the battery 30 is detected.

When the attachment or detachment of the battery 30 is detected, the microcomputer 19 reads out a battery remaining amount from each of the batteries 30 accommodated in the main body 10 (step S102). The microcomputer 19 acquires, for example, data of a battery remaining amount outputted from the communication terminal 31b of each of the batteries 30 accommodated in the main body 10, via corresponding one of the communication terminals 12b.

Next, the microcomputer 19 determines whether or not the battery 30 for communication is decided (step S103). For example, the microcomputer 19 determines whether or not the number of the battery 30 set for communication or the number of the communication terminal 12b corresponding to the battery 30 set for communication is stored in the memory 19b. As a result, in a case where the number of the battery 30 set for communication or the number of the battery accommodation section 11 corresponding to the battery 30 set for communication is stored in the memory 19b, the microcomputer 19 determines that the battery 30 for communication is decided. In contrast, in a case where neither the number of the battery 30 set for communication nor the number of the battery accommodation section 11 corresponding to the battery 30 set for communication is stored in the memory 19b, the microcomputer 19 determines that the battery 30 for communication is not decided.

In the case where the battery 30 for communication is decided, the microcomputer 19 determines whether or not the battery 30 with a battery remaining amount more than the battery remaining amount of the battery 30 for communication is present (step S104). For example, the microcomputer 19 determines whether or not the battery 30 with a battery remaining amount more than the battery remaining amount of the battery 30 for communication is present, on the basis of data of the battery remaining amount read out from each of the batteries 30 accommodated in the main body 10. As a result, in a case where the battery 30 with a battery remaining amount more than the battery remaining amount of the battery 30 for communication is not present, it is not necessary to change the battery 30 for communication. Therefore, the microcomputer 19 does not send out the new control signal 19A to the switch 18. Accordingly, data of the remaining amount of the battery 30 set for communication is outputted from the communication terminal 21b to the imaging unit 100.

In the case where the battery 30 for communication is not decided or in the case where the battery 30 with a battery remaining amount more than the battery remaining amount of the battery 30 for communication is present, the microcomputer 19 selects one of the communication terminals 12b (or one of the batteries 30) on the basis of the remaining amount of each of the batteries 30, and electrically couples the selected communication terminal 12b (or one of the batteries 30) and the communication terminal 21b to each other via the switch 18. For example, the microcomputer 19 selects the battery 30 with the largest battery remaining amount (or the communication terminal 12b corresponding to the battery 30 with the largest battery remaining amount), and electrically couples the selected battery 30 (or the communication terminal 12b) and the communication terminal 21b to each other via the switch 18.

In the case where the battery 30 for communication is not decided or in the case where the battery 30 with a battery remaining amount more than the battery remaining amount of the battery 30 for communication is present, the microcomputer 19 sets the one battery 30 selected on the basis of the remaining amount of each of the batteries 30, as the battery 30 for communication. The microcomputer 19 sets, for example, the battery 30 with the largest battery remaining amount, as the battery 30 for communication (step S105). The microcomputer 19 stores, in the memory 19b, information related to the battery 30 to be electrically coupled to the communication terminal 21b by the control signal 19A described later, or information related to the battery accommodation section 11 that accommodates the battery 30 to be electrically coupled to the communication terminal 21b by the control signal 19A. For example, the microcomputer 19 stores, in the memory 19b, the number of the battery 30 with the largest battery remaining amount (or information related to such a battery 30), or the number of the battery accommodation section 11 corresponding to the battery 30 with the largest battery remaining amount (or information related to such a battery accommodation section 11). In a case where the number of the battery 30 with the largest battery remaining amount (or the information related to such a battery 30), or the number of the battery accommodation section 11 corresponding to the battery 30 with the largest battery remaining amount (or the information related to such a battery accommodation section 11) is already stored in the memory 19b, the microcomputer 19 updates those pieces of information with new pieces of information. In this way, the microcomputer 19 sets the battery 30 with the largest battery remaining amount, as the battery 30 for communication.

Further, the microcomputer 19 causes the switch 18 to select the set battery 30 for communication (step S106). The microcomputer 19 generates, for example, the control signal 19A directed to electrically coupling the set battery 30 for communication (or the communication terminal 12b corresponding to the set battery 30 for communication) and the communication terminal 21b to each other, and inputs the generated control signal 19A to the switch 18. The switch 18 electrically couples the set battery 30 for communication (or the communication terminal 12b corresponding to the set battery 30 for communication) and the communication terminal 21b to each other, in accordance with the control signal 19A inputted from the microcomputer 19. As a result, data of the remaining amount of the newly-set battery 30 for communication is outputted from the communication terminal 21b to the imaging unit 100.

FIG. 6 illustrates an example of the remaining amount of each of the batteries 30 to be attached to the power feed unit 1. A case where the remaining amount of the battery 30 of the battery number (1) is 100%, the remaining amount of the battery 30 of the battery number (2) is 80%, the remaining amount of the battery 30 of the battery number (3) is 60%, and the remaining amount of the battery 30 of the battery number (4) is 40% is exemplified in FIG. 6. FIG. 7 illustrates an example of displacement of a remaining amount of the power feed unit 1 at a time when the power feed unit 1 is attached to the imaging unit 100. A value (a remaining amount %) in a vertical axis in FIG. 7 is displayed on the imaging unit 100. FIG. 8 illustrates an example of displacement of the remaining amount of each of the batteries 30 at a time when the power feed unit 1 is attached to the imaging unit 100. FIG. 8 (A) illustrates an example of the remaining amount at *1 in FIG. 7. FIG. 8 (B) illustrates an example of the remaining amount at *2 in FIG. 7. FIG. 8 (C) illustrates an example of the remaining amount at *3 in FIG. 7. FIG. 8 (D) illustrates an example of the remaining amount at *4 in FIG. 7.

In the present embodiment, the batteries 30 (or the power supply terminals 12a of the respective terminal sections 12) are coupled in parallel with each other, with respect to the power supply terminal 21a. For this reason, among the two or more batteries 30 coupled in parallel with each other, the battery 30 with the largest battery remaining amount (e.g., the battery 30 of the battery number (1)) is used, and other batteries 30 are not used. As a result, for example, as illustrated in FIG. 8 (A) and FIG. 8 (B), only the battery 30 of the battery number (1) is used, until the remaining amount of the battery 30 of the battery number (1) reaches the remaining amount of the battery with the second largest battery remaining amount (e.g., the battery 30 of the battery number (2)). At this time, for example, the remaining amount of the battery 30 of the battery number (1) falls from 100% to 80%, as illustrated in FIG. 7.

Afterward, for example, as illustrated in FIG. 8 (B) and FIG. 8 (C), only the batteries 30 of the battery numbers (1) and (2) are simultaneously used in parallel, until the remaining amount of the battery 30 of each of the battery numbers (1) and (2) reaches the remaining amount of the battery with the third largest battery remaining amount (e.g., the battery 30 of the battery number (3)). At this time, for example, the remaining amount of the battery 30 of each of the battery numbers (1) and (2) falls from 80% to 60%, as illustrated in FIG. 7.

Subsequently, for example, as illustrated in FIG. 8 (C) and FIG. 8 (D), only the batteries 30 of the battery numbers (1) to (3) are simultaneously used in parallel, until the remaining amount of the battery 30 of each of the battery numbers (1) to (3) reaches the remaining amount of the fourth largest battery remaining amount (e.g., the battery 30 of the battery number (4)). At this time, for example, the remaining amount of the battery 30 of each of the battery numbers (1) to (3) falls from 60% to 40%, as illustrated in FIG. 7.

Subsequently, for example, as illustrated in FIG. 8 (D), the batteries 30 of the battery numbers (1) to (4) are simultaneously used in parallel, until the remaining amount of the battery 30 of each of the battery numbers (1) to (4) becomes zero. At this time, for example, the remaining amount of the battery 30 of each of the battery numbers (1) to (4) falls from 40% to 0%, as illustrated in FIG. 7.

Incidentally, in the present embodiment, in a case where the above-described "selection of the battery 30 during feeding" is performed, the battery 30 for communication continues being set to the battery number (1) until the remaining amounts of all the batteries 30 become zero. For this reason, other batteries 30 are not used for communication. At this time, the battery remaining amount displayed on the imaging unit 100 is the remaining amount of the battery 30 of the battery number (1). Therefore, because the battery remaining amount displayed on the imaging unit 100 decreases as the remaining amount of the battery 30 of the battery number (1) decreases, the battery remaining amount displayed on the imaging unit 100 neither increases nor decreases when how many batteries 30 are used is changed.

[Configuration Related to Charging]

Next, a configuration related to charging in the power feed unit 1 is described. FIG. 9 illustrates an example of a circuit configuration of the power feed unit 1 and an AC adapter 200. Only a configuration necessary for charging in the power feed unit 1 is illustrated in FIG. 9. Assume that the main body 10 is in the charge mode. Specifically, assume that each of the batteries 30 (or each of the terminal sections 12) and the power supply input terminal section 15 that is the charge terminal are electrically coupled to each other by the feed/charge switch 16. At this time, each of the GND terminals 12c is coupled to a GND terminal 15b of the power supply input terminal section 15. Further, a switch 23 is provided between each of the power supply terminals 12a and a power supply terminal 15a of the power supply input terminal section 15.

The switch 23 is an electronic control switch that electrically couples one of the two or more power supply terminals 12a and the power supply terminal 15a to each other, in accordance with a control signal 19B provided by the microcomputer 19. The microcomputer 19 outputs, to the switch 23, the control signal 19B which electrically couples the one power supply terminal 12a selected on the basis of the remaining amount of each of the batteries 30 and the power supply terminal 15a to each other. The microcomputer 19 outputs, to the switch 23, the control signal 19B which electrically couples the power supply terminal 12a corresponding to the battery 30 with the smallest remaining amount and the power supply terminal 15a to each other, to the switch 23.

The AC adapter 200 is, for example, an AC-DC adapter that converts commercial alternating-current electric power into direct-current power. The AC adapter 200 includes, for example, an AC outlet 220 to be coupled to a terminal to be supplied with the commercial alternating-current electric power, a power supply IC 210 that converts the commercial alternating-current electric power inputted via the AC outlet 220 into the direct-current power, and a terminal section to be coupled to the power supply input terminal section 15. The terminal section of the AC adapter 200 includes, for example, a power supply terminal 230a and a GND terminal 230b. When the terminal section of the AC adapter 200 is coupled to the power supply input terminal section 15, the power supply terminal 230a is coupled to the power supply terminal 15a, and the GND terminal 230b is coupled to the GND terminal 15b.

(Selection of Battery 30 During Charging)

Next, a procedure for selection of the battery 30 during charging in the power feed unit 1 is described. FIG. 10 and FIG. 11 illustrate an example of the procedure for selection of the battery 30 during charging in the power feed unit 1.

Assume that the main body 10 is in the charge mode. Specifically, assume that each of the batteries 30 (or each of the terminal sections 12) and the power supply input terminal section 15 that is the charge terminal are electrically coupled to each other by the feed/charge switch 16. At this time, the microcomputer 19 detects presence or absence of setting of the charge mode (step S201). For example, the microcomputer 19 detects the presence or absence of the setting of the charge mode, on the basis of a result of communication with the feed/charge switch 16.

When the setting of the charge mode is detected, the microcomputer 19 reads out a battery remaining amount from each of the batteries 30 accommodated in the main body 10 (step S202). For example, the microcomputer 19 acquires data of the battery remaining amount outputted from the communication terminal 31b of each of the batteries 30 accommodated in the main body 10, via corresponding one of the communication terminals 12b.

Next, the microcomputer 19 determines whether or not the battery 30 with a battery remaining amount less than or equal to practical charge is present (step S203). Here, the "practical charge" refers to a charge level that is slightly less than full charge, and refers to, for example, a charge level of about 95%. For example, the microcomputer 19 determines whether or not the battery 30 with a battery remaining amount less than or equal to the practical charge is present, on the basis of the data of the battery remaining amount read out from each of the batteries 30 accommodated in the main body 10. As a result, in a case where the battery 30 with a battery remaining amount less than or equal to the practical charge is not present, the procedure proceeds to step S210 described later.

In contrast, in a case where the battery 30 with a battery remaining amount less than or equal to the practical charge is present, the microcomputer 19 determines whether or not the battery 30 for charging is decided (step S204). For example, the microcomputer 19 determines whether or not the number of the battery 30 set for charging or the number of the battery accommodation section 11 corresponding to the battery 30 set for charging is stored in the memory 19b. As a result, in a case where the number of the battery 30 set for charging or the number of the battery accommodation section 11 corresponding to the battery 30 set for charging is stored in the memory 19b, the microcomputer 19 determines that the battery 30 for charging is decided. In contrast, in a case where neither the number of the battery 30 set for charging nor the number of the battery accommodation section 11 corresponding to the battery 30 set for charging is stored in the memory 19b, the microcomputer 19 determines that the battery 30 for charging is not decided.

In the case where the battery 30 for charging is decided, the microcomputer 19 determines whether or not the battery 30 with a battery remaining amount less than the battery remaining amount of the battery 30 for charging is present (step S205). For example, the microcomputer 19 determines whether or not the battery 30 with a battery remaining amount less than the battery remaining amount of the battery 30 for charging is present, on the basis of the data of the battery remaining amount read out from each of the batteries 30 accommodated in the main body 10. As a result, in a case where the battery 30 with a battery remaining amount less than the battery remaining amount of the battery 30 for charging is not present, it is not necessary to change the battery 30 for charging, and thus, the microcomputer 19 does not send out the new control signal 19B to the switch 23. Therefore, electric power inputted to the power supply terminal 15a is applied to the battery 30 set for charging.

In the case where the battery 30 for charging is not decided, or in the case where the battery 30 with a battery remaining amount less than the battery remaining amount of the battery 30 for charging is present, the microcomputer 19 selects one of the power supply terminals 12a (or one of the batteries 30) on the basis of the remaining amount of each of the batteries 30, and electrically couples the selected power supply terminal 12a (or battery 30) and the power supply terminal 15a to each other via the switch 23. For example, the microcomputer 19 selects the battery 30 with the smallest battery remaining amount (or the power supply terminal 12a corresponding to the battery 30 with the smallest battery remaining amount), and electrically couples the selected battery 30 (or power supply terminal 12a) and the power supply terminal 15a to each other via the switch 23.

In the case where the battery 30 for charging is not decided, or in the case where the battery 30 with a battery remaining amount less than the battery remaining amount of the battery 30 for charging is present, the microcomputer 19 sets the one battery 30 selected on the basis of the remaining amount of each of the batteries 30, as the battery 30 for charging. For example, the microcomputer 19 sets the battery 30 with the smallest battery remaining amount, as the battery 30 for charging (step S206). The microcomputer 19 stores, in the memory 19b, information related to the battery 30 to be electrically coupled to the power supply terminal 15a by the control signal 19B described later, or information related to the battery accommodation section 11 that accommodates the battery 30 to be electrically coupled to the power supply terminal 15a by the control signal 19B. For example, the microcomputer 19 stores, in the memory 19b, the number of the battery 30 with the smallest battery remaining amount (or information related to such a battery 30), or the number of the battery accommodation section 11 corresponding to the battery 30 with the smallest battery remaining amount (or information related to such a battery accommodation section 11). In this way, the microcomputer 19 sets the battery 30 with the smallest battery remaining amount, as the battery 30 for charging.

Further, the microcomputer 19 causes the switch 23 to select the set battery 30 for charging (step S207). The microcomputer 19 generates, for example, the control signal 19B directed to electrically coupling the set battery 30 for charging (or the power supply terminal 12a corresponding to the set battery 30 for charging) and the power supply terminal 15a to each other, and inputs the generated control signal 19B to the switch 23. The switch 23 electrically couples the set battery 30 for charging (or the power supply terminal 12a corresponding to the set battery 30 for charging) and the power supply terminal 15a to each other, in accordance with the control signal 19B inputted from the microcomputer 19. As a result, the electric power inputted to the power supply terminal 15a is applied to the battery 30 newly set for charging.

After executing step S205 or step S207, the microcomputer 19 determines whether or not the remaining amount of the battery 30 for charging is beyond the practical charge (step S208). As a result, in a case where the remaining amount of the battery 30 for charging is not beyond the practical charge, the microcomputer 19 regularly executes step S208. In a case where the remaining amount of the battery 30 for charging is beyond the practical charge, the microcomputer 19 determines whether or not the battery 30 with a battery remaining amount less than the battery remaining amount of the battery 30 for charging is present (step S209). As a result, in a case where the battery 30 with a battery remaining amount less than the battery remaining amount of the battery 30 for charging is present, the microcomputer 19 executes step S206. In a case where the battery 30 with a battery remaining amount less than the battery remaining amount of the battery 30 for charging is not present, the procedure proceeds to step 210 described later.

The microcomputer 19 sets the battery 30 of an attachment position A1 as the battery 30 for charging (step S210). The attachment position A1 refers to any one of the two or more (e.g., four) battery accommodation sections 11 provided in the main body 10. For example, the microcomputer 19 stores, in the memory 19b, the number of the battery 30 corresponding to the attachment position A1 or the number of the attachment position A1. In this way, the microcomputer 19 sets the battery 30 of the attachment position A1, as the battery 30 for charging.

Next, the microcomputer 19 causes the switch 23 to select the set battery 30 for charging (step S211). The microcomputer 19 generates, for example, the control signal 19B directed to electrically coupling the set battery 30 for charging (or the power supply terminal 12a corresponding to the set battery 30 for charging) and the power supply terminal 15a to each other, and inputs the generated control signal 19B to the switch 23. The switch 23 electrically couples the set battery 30 for charging (or the power supply terminal 12a corresponding to the set battery 30 for charging) and the power supply terminal 15a to each other, in accordance with the control signal 19B inputted from the microcomputer 19. As a result, the electric power inputted to the power supply terminal 15a is applied to the battery 30 set for charging.

Next, the microcomputer 19 determines whether or not the battery 30 for charging is fully charged (step S212). As a result, in a case where the battery 30 for charging is not fully charged, the microcomputer 19 regularly executes step S212. In a case where the battery 30 for charging is fully charged, the microcomputer 19 determines whether or not the next attachment position is present (step S213). As a result, in a case where the next attachment position is not present (in other words, in a case where all the batteries 30 are fully charged), the microcomputer 19 ends the charging.

In a case where the next attachment position is present (in other words, not all the batteries 30 are fully charged), the microcomputer 19 sets the battery 30 of the next attachment position, as the battery 30 for charging (step S214). For example, the microcomputer 19 stores, in the memory 19b, the number of the battery 30 corresponding to the next attachment position, or the number of the next attachment position. In this way, the microcomputer 19 sets the battery 30 of the next attachment position, as the battery 30 for charging. Afterward, the microcomputer 19 proceeds to step S211.

[Effects]

Next, effects of the power feed unit 1 of the present embodiment are described.

In a lithium ion battery, estimating a remaining amount on the basis of a voltage is difficult. For this reason, a microcomputer is mounted on a battery pack to measure the remaining amount of the battery. Incidentally, in a case where two or more batteries are used, an electronic apparatus that receives power supply from each of the batteries grasps a remaining amount of each of the batteries by performing communication with each of the batteries. However, providing, in the electronic apparatus, a special terminal configuration that is different from a terminal configuration for communication between the electronic apparatus and one battery to perform such communication is to be avoided from the viewpoint of cost and the like.

In contrast, in the present embodiment, one of the two or more communication terminals 12b each to be coupled to the corresponding one of the batteries 30 with respect to the batteries 30 and the communication terminal 21b to be coupled to the imaging unit 100 are electrically coupled to each other by the switch 18. This makes it possible to provide the imaging unit 100 with a terminal configuration similar to a terminal configuration for communication between the imaging unit 100 and the one battery 30. As a result, it is possible to perform communication between the imaging unit 100 and each of the batteries 30 in a common terminal configuration regardless of how many batteries 30 are provided.

Further, in the present embodiment, the power feed unit 1 is provided with the microcomputer that outputs, to the switch 18, the control signal 19A which electrically couples the one communication terminal 12b selected on the basis of the remaining amount of each of the batteries 30 and the communication terminal 21b to each other. This makes it possible to provide the imaging unit 100 with a terminal configuration similar to the terminal configuration for communication between the imaging unit 100 and the one battery 30. As a result, it is possible to perform communication between the imaging unit 100 and each of the batteries 30 in the common terminal configuration regardless of how many batteries 30 are provided.

Furthermore, in the present embodiment, the power feed unit 1 is provided with the circuit (the parallel coupling circuit 26) that couples the two or more power supply terminals 12*a* to each other in parallel, with respect to the power supply terminal 21*a*. This makes it possible not only to perform communication between the imaging unit 100 and each of the batteries 30 in the common terminal configuration regardless of how may batteries 30 are provided, but also to achieve smooth remaining amount displacement, for example, as illustrated in FIG. 7.

Moreover, in the present embodiment, the control signal 19A, which electrically couples the communication terminal 12*b* corresponding to the battery 30 with the largest battery remaining amount and the communication terminal 21*b* to each other, is outputted to the switch 18. This makes it possible not only to perform communication between the imaging unit 100 and each of the batteries 30 in the common terminal configuration regardless of how many batteries 30 are provided, but also to achieve smooth remaining amount displacement, for example, as illustrated in FIG. 7.

2. Modification Examples

Next, modification examples of the power feed unit 1 of the first embodiment are described.

Modification Example A

FIG. 12 illustrates a modification example of the circuit configuration of the power feed unit 1 and the imaging unit 100. The power feed unit 1 of the present modification example corresponds to the power feed unit 1 of the foregoing embodiment in which a switch 24 (a second switch) is provided between each of the output switches 14 and the power supply terminal 21*a*. In other words, in the present modification example, the two or more batteries 30 are not coupled in parallel, with respect to the power supply terminal 21*a*.

The switch 24 is an electronic control switch that electrically couples one of the two or more power supply terminals 12*a* and the power supply terminal 21*a* to each other, in accordance with a control signal 19C provided by the microcomputer 19. The microcomputer 19 outputs, to the switch 24, the control signal 19C which electrically couples the one power supply terminal 12*a* selected on the basis of the remaining amount of each of the batteries 30 and the power supply terminal 21*a* to each other. The microcomputer 19 outputs, to the switch 24, the control signal 19C which electrically couples the power supply terminal 12*a* corresponding to the battery 30 with the largest remaining amount and the power supply terminal 21*a* to each other.
(Selection of Battery 30 During Feeding)

Next, a procedure for selection of the battery 30 during feeding in the power feed unit 1 of the present modification example is described. FIG. 13 illustrates an example of the procedure for selection of the battery 30 during feeding in the power feed unit 1 of the present modification example. It is to be noted that, in the present modification example, the power feed unit 1 also executes each step illustrated in FIG. 5, and further executes each step illustrated in FIG. 13.

Assume that the main body 10 is in the feed mode. Specifically, assume that each of the batteries 30 (or each of the terminal sections 12) and the terminal section 21 that is the feed terminal are electrically coupled to each other by the feed/charge switch 16. At this time, the microcomputer 19 regularly reads out a battery remaining amount from each of the batteries 30 accommodated in the main body 10 (step S301). For example, the microcomputer 19 regularly acquires data of the battery remaining amount outputted from the communication terminal 31*b* of each of the batteries 30 accommodated in the main body 10, via corresponding one of the communication terminals 12*b*.

Next, the microcomputer 19 determines whether or not the remaining amount of the battery 30 for communication is less than or equal to a predetermined threshold (step S302). Here, the "predetermined threshold" refers to a remaining amount that is slightly larger than 0%, and refers to, for example, 5%. In a case where the remaining amount of the battery 30 for communication is not less than or equal to the predetermined threshold, the microcomputer 19 executes step S301. In a case where the remaining amount of the battery 30 for communication being less than or equal to the predetermined threshold is detected, the microcomputer 19 sets the one battery 30 selected on the basis of the remaining amount of each of the batteries 30, as the battery 30 for communication. For example, the microcomputer 19 sets the battery 30 with the largest battery remaining amount, as the battery 30 for communication (step S303). The microcomputer 19 stores, in the memory 19*b*, information related to the battery 30 to be electrically coupled to the communication terminal 21*b* by the control signal 19A described later, or information related to the battery accommodation section 11 that accommodates the battery 30 to be electrically coupled to the communication terminal 21*b* by the control signal 19A. For example, the microcomputer 19 stores, in the memory 19*b*, the number of the battery 30 with the largest battery remaining amount (or information related to such a battery 30), or the number of the battery accommodation section 11 corresponding to the battery 30 with the largest battery remaining amount (or information related to such a battery accommodation section 11). In a case where the number of the battery 30 with the largest battery remaining amount (or the information related to such a battery 30), or the number of the battery accommodation section 11 corresponding to the battery 30 with the largest battery remaining amount (or the information related to such a battery accommodation section 11) is already stored in the memory 19*b*, the microcomputer 19 updates those pieces of information with new pieces of information. In this way, the microcomputer 19 sets the battery 30 with the largest battery remaining amount, as the battery 30 for communication.

Further, the microcomputer 19 causes the switch 18 to select the set battery 30 for communication (step S304). For example, the microcomputer 19 electrically couples the set battery 30 for communication (or the communication terminal 12*b* corresponding to the set battery 30 for communication) and the communication terminal 21*b* to each other, via the switch 18. The microcomputer 19 generates, for example, the control signal 19A directed to electrically coupling the set battery 30 for communication (or the communication terminal 12*b* corresponding to the set battery 30 for communication) and the communication terminal 21*b* to each other, and inputs the generated control signal 19A to the switch 18. The switch 18 electrically couples the set battery 30 for communication (or the communication terminal 12*b* corresponding to the set battery 30 for communication) and the communication terminal 21*b* to each other, in accordance with the control signal 19A inputted from the microcomputer 19. As a result, data of the remaining amount of the newly-set battery 30 for communication is outputted from the communication terminal 21*b* to the imaging unit 100.

The microcomputer 19 causes the switch 18 to select the battery 30 for communication, and causes the switch 24 to select the battery 30 for communication, simultaneously. The microcomputer 19 generates, for example, the control signal 19C directed to electrically coupling the set battery 30 for communication (or the power supply terminal 12a corresponding to the set battery 30 for communication) and the power supply terminal 21a to each other, and inputs the generated control signal 19C to the switch 24. The switch 24 electrically couples the set battery 30 for communication (or the power supply terminal 12a corresponding to the set battery 30 for communication) and the power supply terminal 21a to each other, in accordance with the control signal 19C inputted from the microcomputer 19. As a result, the electric power outputted from the battery 30 for communication is inputted to the imaging unit 100 via the power supply terminal 21a.

In the present modification example, for example, when executing step S102 in FIG. 5, the microcomputer 19 causes the switch 18 to select all the batteries 30 accommodated in the main body 10, and causes the remaining amounts of all the batteries 30 from the communication terminal 21b to the imaging unit 100. It is to be noted that timing of causing the remaining amounts of all the batteries 30 to the imaging unit 100 may not be a time when step S102 in FIG. 5 is executed. When the data of the remaining amounts of all the batteries 30 is inputted from the power feed unit 1, the microcomputer 130 of the imaging unit 100 calculates, for example, a sum of the remaining amounts of all the batteries 30, and stores, in a memory within the microcomputer 130, the remaining amount (an individual remaining amount) of each of the batteries 30 and the calculated sum (an initial total remaining amount). When the data of the remaining amount of one of the batteries 30 is inputted from the power feed unit 1, the microcomputer 130 of the imaging unit 100 stores, in the memory, for example, the inputted remaining amount as the individual remaining amount, recalculates the sum of the remaining amounts of all the batteries 30, and stores, in the memory, the recalculated sum (a current total remaining amount). Further, for example, the microcomputer 130 of the imaging unit 100 derives a remaining amount of the power feed unit 1, by calculating (current total remaining amount/initial total remaining amount)×100. Thus deriving the remaining amount of the power feed unit 1 makes it possible to vary the remaining amount linearly as illustrated in FIG. 14 described later.

FIG. 14 illustrates an example of displacement of the remaining amount of the power feed unit 1 at a time when the power feed unit 1 of the present modification example is attached to the imaging unit 100. A value (a remaining amount %) in a vertical axis in FIG. 14 is displayed on the imaging unit 100. FIG. 15 illustrates an example of displacement of the remaining amount of each of the batteries 30 at a time when the power feed unit 1 of the present modification example is attached to the imaging unit 100. It is to be noted that the remaining amount of each of the batteries 30 to be attached to the power feed unit 1 of the present modification example is, for example, as illustrated in FIG. 6. FIG. 15 (A) illustrates an example of the remaining amount at *1 in FIG. 14. FIG. 15 (B) illustrates an example of the remaining amount at *2 in FIG. 14. FIG. 15 (C) illustrates an example of the remaining amount at *3 in FIG. 14. FIG. 15 (D) illustrates an example of the remaining amount at *4 in FIG. 14.

In the present modification example, the two or more batteries 30 accommodated in the main body 10 are sequentially selected in decreasing order of battery remaining amount. For this reason, among the two or more batteries 30 accommodated in the main body 10, the battery 30 with the largest battery remaining amount (e.g., the battery 30 of the battery number (1)) is used first, and other batteries 30 are not used. As a result, for example, as illustrated in FIG. 15 (A) and FIG. 15 (B), only the battery 30 of the battery number (1) is used, until the remaining amount of the battery 30 of the battery number (1) reaches the predetermined threshold. At this time, for example, the battery remaining amount of the entire power feed unit 1 falls from 100% to 60%, as illustrated in FIG. 14.

Afterward, for example, as illustrated in FIG. 15 (B) and FIG. 15 (C), the battery 30 with the second largest battery remaining amount (e.g., the battery 30 of the battery number (2)) is used first, and other batteries 30 are not used. As a result, for example, as illustrated in FIG. 15 (B) and FIG. 15 (C), only the battery 30 of the battery number (2) is used, until the remaining amount of the battery 30 of the battery number (2) reaches the predetermined threshold. At this time, for example, the battery remaining amount of the entire power feed unit 1 falls from 60% to 40%, as illustrated in FIG. 14.

Subsequently, for example, as illustrated in FIG. 15 (C) and FIG. 15 (D), the battery 30 with the third largest battery remaining amount (e.g., the battery 30 of the battery number (3)) is used first, and other batteries 30 are not used. As a result, for example, as illustrated in FIG. 15 (C) and FIG. 15 (D), only the battery 30 of the battery number (3) is used, until the remaining amount of the battery 30 of the battery number (3) reaches the predetermined threshold. At this time, for example, the battery remaining amount of the entire power feed unit 1 falls from 40% to 14%, as illustrated in FIG. 14.

Subsequently, for example, as illustrated in FIG. 15 (D), the battery 30 with the fourth largest battery remaining amount (e.g., the battery 30 of the battery number (4)) is used, and other batteries 30 are not used. As a result, for example, as illustrated in FIG. 15 (D), only the battery 30 of the battery number (4) is used, until the remaining amount of the battery 30 of the battery number (4) reaches the predetermined threshold. At this time, for example, the battery remaining amount of the entire power feed unit 1 falls from 14% to the predetermined threshold, as illustrated in FIG. 14.

In the present modification example, one of the two or more communication terminals 12b each to be coupled to the corresponding one of the batteries 30 with respect to the batteries 30 and the communication terminal 21b to be coupled to the imaging unit 100 are electrically coupled to each other by the switch 18. This makes it possible to provide the imaging unit 100 with a terminal configuration similar to the terminal configuration for communication between the imaging unit 100 and the one battery 30. As a result, it is possible to perform communication between the imaging unit 100 and each of the batteries 30 in the common terminal configuration regardless of how may batteries 30 are provided.

Further, in the present modification example, the power feed unit 1 is provided with the microcomputer that outputs, to the switch 18, the control signal 19A which electrically couples the one communication terminal 12b selected on the basis of the remaining amount of each of the batteries 30 and the communication terminal 21b to each other. This makes it possible to provide the imaging unit 100 with a terminal configuration similar to the terminal configuration for communication between the imaging unit 100 and the one battery 30. As a result, it is possible to perform communication between the imaging unit 100 and each of the batteries 30 in the common terminal configuration regardless of how many batteries 30 are provided.

Furthermore, in the present modification example, the power feed unit 1 is provided with the switch 24 directed to electrically coupling one of the two or more power supply terminals 12a and the power supply terminal 21a to each other. This makes it possible not only to perform communication between the imaging unit 100 and each of the batteries 30 in the common terminal configuration regardless of how many batteries 30 are provided, but also to achieve smooth remaining amount displacement as illustrated in FIG. 14, for example.

Moreover, in the present modification example, the control signal 19A, which electrically couples the communication terminal 12b corresponding to the battery 30 with the largest battery remaining amount and the communication terminal 21b to each other, is outputted to the switch 18. This makes it possible not only to perform communication between the imaging unit 100 and each of the batteries 30 in the common terminal configuration regardless of how many batteries 30 are provided, but also to achieve smooth remaining amount displacement as illustrated in FIG. 14, for example.

Modification Example B

FIG. 16 illustrates a modification example of the circuit configuration of the power feed unit 1 and the imaging unit 100. The power feed unit 1 of the present modification example corresponds to the power feed unit 1 of the foregoing embodiment in which the microcomputer 19 is omitted, and a switch 25 to be manually operated is provided in place of the switch 18 of electronic control. The switch 25 is a manual switch that electrically couples one of the two or more communication terminals 12b and the communication terminal 21b to each other.

In the present modification example, the circuit (the parallel coupling circuit 26) that couples the two or more power supply terminals 12a to each other in parallel with respect to the power supply terminal 21a is provided, and the switch 18 to be manually operated is provided. This makes it possible not only to perform communication between the imaging unit 100 and each of the batteries 30 in the common terminal configuration regardless of how many batteries 30 are provided by manually switching the switch 18, but also to achieve smooth remaining amount displacement, for example, as illustrated in FIG. 7, even if the power feed unit 1 is not provided with the microcomputer 19.

Although the descriptions have been provided above for the present disclosure by way of the embodiment and modification examples, the present disclosure is not limited to the embodiment, etc. described above, and may be modified in a variety of ways. It is to be noted that the effects described herein are merely exemplified. The effects of the present disclosure are not limited to the effects described in the present specification. The present disclosure may have an effect other than the effects described in the present specification.

Further, the present disclosure may have the following configurations, for example.

(1)

A power feed unit that feeds electric power of two or more batteries provided with a microcomputer to an electronic apparatus, the power feed unit including:

two or more accommodation sections that accommodate the two or more batteries;

two or more first terminal sections at least one or more of which are provided for each of the accommodation sections, the two or more first terminal sections each including a first power supply terminal directed to receiving electric power from the battery, and a first communication terminal directed to performing communication with the battery;

a second terminal section including a second power supply terminal directed to supplying electric power to the electronic apparatus, and a second communication terminal directed to performing communication with the electronic apparatus; and a first switch directed to electrically coupling one first communication terminal of the two or more first communication terminals and the second communication terminal to each other.

(2)

The power feed unit according to (1), further including a microcomputer that outputs, to the first switch, a control signal that electrically couples the one first communication terminal selected on the basis of a remaining amount of each of the batteries and the second communication terminal to each other.

(3)

The power feed unit according to (1) or (2), further including a circuit that couples the two or more first power supply terminals to each other in parallel, with respect to the second power supply terminal.

(4)

The power feed unit according to (1) or (2), further including a second switch directed to electrically coupling the one first power supply terminal of the two or more first power supply terminals and the second power supply terminal to each other.

(5)

The power feed unit according to (2), in which the microcomputer outputs, to the first switch, a control signal, as the control signal, that electrically couples the first communication terminal corresponding to the battery with a largest battery remaining amount and the second communication terminal to each other.

(6)

The power feed unit according to (4), in which the microcomputer outputs, to the second switch, a control signal that electrically couples the first power supply terminal corresponding to the battery with a largest battery remaining amount and the second power supply terminal to each other.

(7)

The power feed unit according to (1), further including a circuit that couples the two or more first power supply terminals to each other in parallel, with respect to the second power supply terminal, in which the first switch includes a manual switch.

(8)

The power feed unit according to any one of (1) to (7), in which the second terminal section has a terminal configuration corresponding to the first terminal section.

(9)

The power feed unit according to any one of (1) to (6), in which the microcomputer includes a memory, and stores, in the memory, information related to the battery to be electrically coupled to the second communication terminal by the control signal, or information related to the accommodation section that accommodates the battery to be electrically coupled to the second communication terminal by the control signal.

(10)

The power feed unit according to (9), in which, in a case where attachment of the battery to the accommodation section or detachment of the battery from the accommodation section is detected, and when the battery with a battery remaining amount more than a battery remaining amount of the battery electrically coupled to the second communication terminal via the first switch is present, the microcomputer updates the information related to the battery stored in the memory or the information related to the accommodation section stored in the memory.

(11)

The power feed unit according to any one of (1) to (10), further including a coupling section that includes the second terminal section and has a shape identical or similar to a shape of the battery.

(12)

A power feeding method of feeding electric power of two or more batteries provided with a microcomputer from a power feed unit to an electronic apparatus, the power feed unit including two or more accommodation sections that accommodate the two or more batteries, two or more first terminal sections at least one or more of which are provided for each of the accommodation sections, the two or more first terminal sections each including a first power supply terminal directed to receiving electric power from the battery, and a first communication terminal directed to performing communication with the battery, a second terminal section including a second power supply terminal directed to supplying electric power to the electronic apparatus, and a second communication terminal directed to performing communication with the electronic apparatus, and a first switch directed to electrically coupling one first communication terminal of the two or more first communication terminals and the second communication terminal to each other, the power feeding method including:

selecting the one first communication terminal on the basis of a remaining amount of each of the batteries when detecting attachment or detachment of one or more of the batteries on the basis of a result of communication with each of the batteries via corresponding one of the first communication terminals, and electrically coupling the selected first communication terminal and the second communication terminal to each other via the first switch.

(13)

The power feeding method according to (12), including selecting the one first communication terminal on the basis of the remaining amount of each of the batteries when detecting the attachment or detachment, and electrically coupling the selected first communication terminal and the second communication terminal to each other via the first switch.

(14)

The power feeding method according to (12), including selecting the first communication terminal corresponding to the battery with a largest battery remaining amount when detecting the attachment or detachment, and electrically coupling the selected first communication terminal and the second communication terminal to each other via the first switch.

(15)

The power feeding method according to (12), in which the power feed unit further includes a second switch directed to electrically coupling the one first power supply terminal of the two or more first power supply terminals and the second power supply terminal to each other, and the power feeding method including selecting the one power supply terminal on the basis of the remaining amount of each of the batteries when detecting the remaining amount of the battery electrically coupled to the second power supply terminal is less than or equal to a predetermined threshold, and electrically coupling the selected first power supply terminal and the second power supply terminal to each other via the second switch.

The present application is based on and claims priority from Japanese Patent Application No. 2017-081867 filed with the Japan Patent Office on Apr. 18, 2017, the entire contents of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A power feed unit that feeds electric power of batteries equipped with a microcomputer to an electronic apparatus, the power feed unit comprising:

accommodation sections that accommodate the batteries;

first terminal sections, at least one of the first terminal sections being provided for each accommodation section of the accommodation sections, the first terminal sections each including a first power supply terminal directed to receiving electric power from a battery of the batteries, and a first communication terminal directed to performing a communication with the battery;

a second terminal section including a second power supply terminal directed to supplying electric power to the electronic apparatus, and a second communication terminal directed to performing a communication with the electronic apparatus; and a first switch directed to electrically coupling one of the first communication terminals with the second communication terminal.

2. The power feed unit according to claim 1, further comprising a microcomputer that outputs, to the first switch, a control signal that electrically couples the one of the first communication terminals with the second communication terminal, the one of the first communication terminals being selected based on a remaining amount of each of the batteries.

3. The power feed unit according to claim 2, further comprising a circuit that couples the first power supply terminals with each other in parallel.

4. The power feed unit according to claim 2, further comprising a second switch directed to electrically coupling one of the first power supply terminals with the second power supply terminal.

5. The power feed unit according to claim 4, wherein the microcomputer outputs the control signal to the second switch to electrically couple the first power supply terminal corresponding to the battery that has a largest battery remaining amount with the second power supply terminal.

6. The power feed unit according to claim 2, wherein the microcomputer outputs the control signal to the first switch to electrically couples the first communication terminal corresponding to the battery that has a largest battery remaining amount with the second communication terminal.

7. The power feed unit according to claim 2, wherein the microcomputer includes a memory that stores information related to the battery to be electrically coupled to the second communication terminal by the control signal, or information related to the accommodation section that accommodates the battery to be electrically coupled to the second communication terminal by the control signal.

8. The power feed unit according to claim 7, wherein, in a case where an attachment of the battery to the accommodation section or a detachment of the battery from the accommodation section is detected, and when the battery with a battery remaining amount more than a battery remaining amount of the battery electrically coupled to the second communication terminal via the first switch is present, the microcomputer updates the information related to the battery stored in the memory or the information related to the accommodation section stored in the memory.

9. The power feed unit according to claim 1, further comprising
a circuit that couples the first power supply terminals with each other in parallel wherein
the first switch comprises a manual switch.

10. The power feed unit according to claim 1, wherein the second terminal section has a terminal configuration corresponding to at least one of the first terminal sections.

11. The power feed unit according to claim 1, further comprising a coupling section that includes the second terminal section and has a shape identical or similar to a shape of the battery.

12. A power feeding method of feeding electric power of batteries equipped with a microcomputer from a power feed unit to an electronic apparatus,
the power feed unit including
accommodation sections that accommodate the batteries, first terminal sections, at least one of the first terminal sections being provided for each accommodation section of the accommodation sections, the first terminal sections each including a first power supply terminal directed to receiving electric power from one of the batteries, and a first communication terminal directed to performing a communication with the battery,
a second terminal section including a second power supply terminal directed to supplying electric power to the electronic apparatus, and a second communication terminal directed to performing a communication with the electronic apparatus, and
a first switch directed to electrically coupling one of the first communication terminals with the second communication terminal,
the power feeding method comprising:
determining a selected first communication terminal on a basis of a battery remaining amount of each of the batteries when detecting an attachment or a detachment of one or more of the batteries on a basis of a result of a communication with each of the batteries via a corresponding first communication terminal, and electrically coupling the selected first communication terminal with the second communication terminal via the first switch.

13. The power feeding method according to claim 12, further comprising selecting the selected first communication terminal on the basis of the remaining amount of each of the batteries when detecting the attachment or the detachment.

14. The power feeding method according to claim 12, further comprising selecting the first communication terminal corresponding to the battery with a largest battery remaining amount when detecting the attachment or the detachment.

15. The power feeding method according to claim 12, wherein
the power feed unit further includes a second switch directed to electrically coupling a selected first power supply terminal with the second power supply terminal, and
the power feeding method further comprises determining the selected first power supply terminal on the basis of the remaining amount of each of the batteries when detecting that the remaining amount of the battery electrically coupled to the second power supply terminal is less than or equal to a predetermined threshold, and electrically coupling the selected first power supply terminal with the second power supply terminal via the second switch.

* * * * *